US012434498B2

(12) United States Patent
Kohnotoh et al.

(10) Patent No.: US 12,434,498 B2
(45) Date of Patent: Oct. 7, 2025

(54) PRINTING APPARATUS

(71) Applicant: CANON KABUSHIKI KAISHA, Tokyo (JP)

(72) Inventors: Atsushi Kohnotoh, Tokyo (JP); Takashi Abe, Kanagawa (JP); Ken Takenaga, Kanagawa (JP); Yusuke Naratani, Tokyo (JP); Kousuke Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 18/377,494

(22) Filed: Oct. 6, 2023

(65) Prior Publication Data

US 2024/0116302 A1 Apr. 11, 2024

(30) Foreign Application Priority Data

Oct. 7, 2022 (JP) ................................ 2022-162666

(51) Int. Cl.
*B41J 29/00* (2006.01)
*B41J 2/175* (2006.01)
*B41J 13/03* (2006.01)

(52) U.S. Cl.
CPC ............... *B41J 29/00* (2013.01); *B41J 2/175* (2013.01); *B41J 13/03* (2013.01)

(58) Field of Classification Search
CPC ... B41J 29/00; B41J 2/175; B41J 13/03; B41J 29/02; B41J 29/13
See application file for complete search history.

(56) References Cited

U.S. PATENT DOCUMENTS 10,946,663 B2 * 3/2021 Kohnotoh ................ B41J 2/155

FOREIGN PATENT DOCUMENTS

| | | | |
|---|---|---|---|
| JP | 2000-218822 | A | 8/2000 |
| JP | 6624759 | B2 | 12/2019 |
| WO | 2017/036490 | A1 | 3/2017 |

OTHER PUBLICATIONS

U.S. Appl. No. 18/139,556, Hiromasa Tsutsumi Hideaki Matsumura Tsuyoshi Saeki Yuri Mori Koki Shimada Shota Asada Ken Takenaga Daiju Takeda Mineyoshi Tomie, filed Apr. 26, 2023.

* cited by examiner

*Primary Examiner* — Bradley W Thies
(74) *Attorney, Agent, or Firm* — Venable LLP

(57) ABSTRACT

An apparatus includes a support member configured to support a printhead, a rotating member configured to be supported by the support member so as to be rotatable to an open position at which the printhead is capable of being attached to or detached from the support member and a closed position, a shaft portion arranged on one of the rotating member and the support member, a shaft supporting portion arranged on the other of the rotating member and the support member, the shaft portion being inserted to the shaft supporting portion in an axial direction, and a structure configured to regulate displacement of the rotating member in the axial direction in a predetermined rotation range of the rotating member, and permit displacement of the rotating member in the axial direction in a rotation position outside the predetermined rotation range.

15 Claims, 18 Drawing Sheets

PRINTING APPARATUS

BACKGROUND OF THE INVENTION

Field of the Invention

The present invention relates to a printing apparatus.

Description of the Related Art

Printing apparatuses that include a rotating member that is opened and closed when attaching or detaching a printhead have been proposed. For example, Japanese Patent No. 6624759 discloses a printing apparatus that has a configuration in which a tube for supplying printhead ink is connected to a printhead by using a joint member. In this printing apparatus, opening and closing of a cover and insertion and removal of a joint from the printhead are interlinked by configuring a cover member, which holds the joint member, to be attached to a carriage in a rotatable manner.

Among configurations that include a shaft and a hole into which the shaft is to be inserted as a structure for rotating a rotating member, those that utilize temporary deformation of the member when being assembled are known. In such configurations, bending of a member is utilized, and so, when rigidity of surroundings of a shaft is increased, assemblability deteriorates. When it is made easier to bend a member of surroundings of a shaft in consideration of assemblability, a component may bend and fall out upon a strong impact during transportation or the like.

SUMMARY OF THE INVENTION

The present invention provides a technique capable of achieving both rigidity of surroundings of a shaft and assemblability.

According to an aspect of the present invention, there is provided a printing apparatus comprising: a support member configured to support a printhead that performs printing by discharging liquid; a rotating member configured to be supported by the support member so as to be rotatable and capable of rotating to an open position at which the printhead is capable of being attached to or detached from the support member and a closed position at which the printhead is not capable of being attached to or detached from the support member; a shaft portion arranged on one of the rotating member and the support member, and being a rotation center of the rotating member; a shaft supporting portion arranged on the other of the rotating member and the support member, the shaft portion being inserted to the shaft supporting portion in an axial direction so as to be supported by the shaft supporting portion; and a displacement regulation structure configured to regulate displacement of the rotating member in the axial direction with respect to the support member in a predetermined rotation range of the rotating member, and permit displacement of the rotating member in the axial direction in a rotation position outside the predetermined rotation range.

Further features of the present invention will become apparent from the following description of exemplary embodiments (with reference to the attached drawings).

DESCRIPTION OF THE EMBODIMENTS

Figure 1:
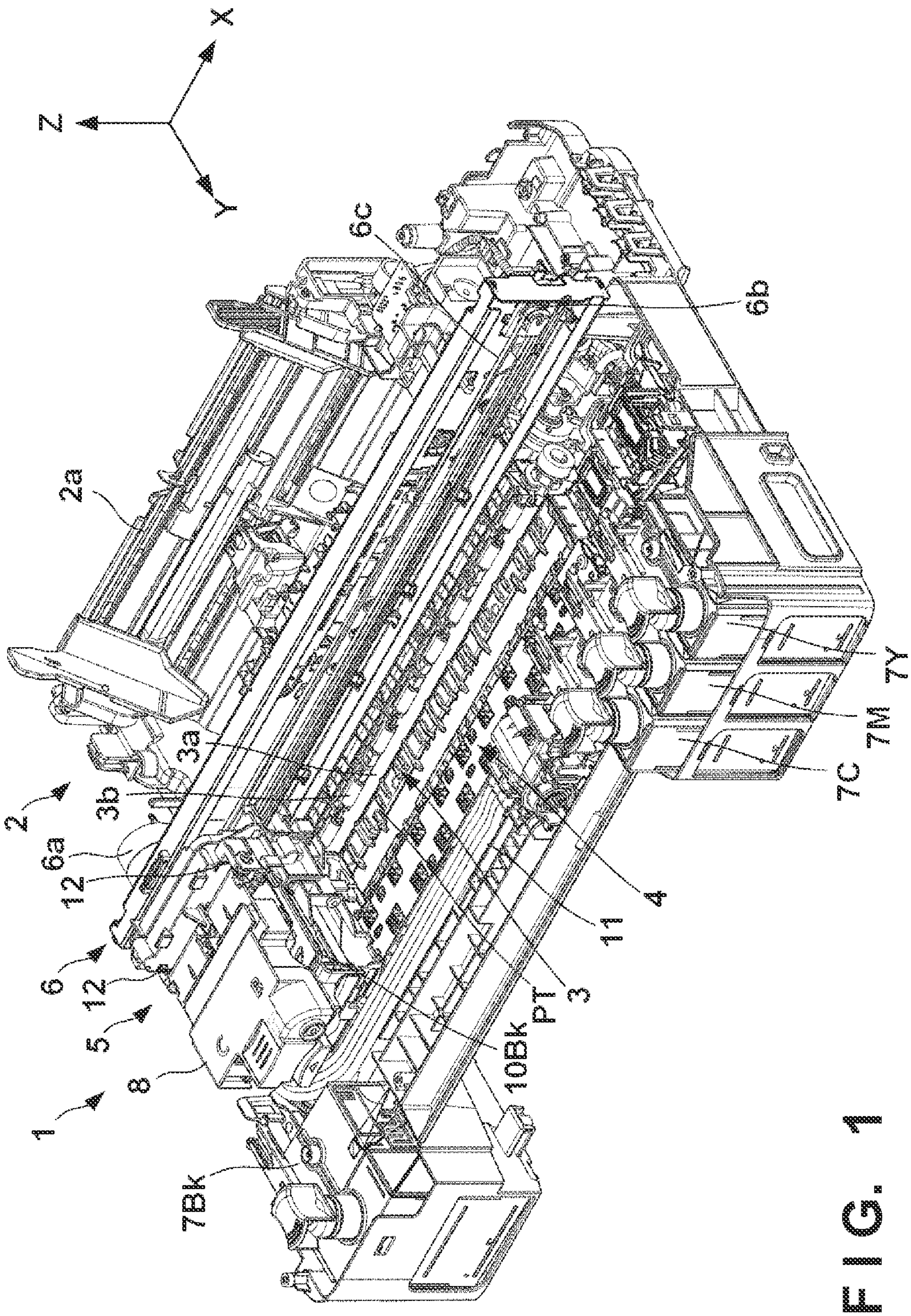
FIG. 1 is an external view of a printing apparatus according to one embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

"1. Overview of Printing Apparatus"

FIG. 1 is a perspective view of a printing apparatus 1 according to one embodiment of the present invention. The printing apparatus 1 of the present embodiment is an inkjet printing apparatus, which performs printing on a print medium by discharging liquid ink; however, the present invention is also applicable to various printing apparatuses aside from the inkjet printing apparatus. In the drawing, arrows X and Y indicate directions that intersect with each other, and in the present embodiment, they are orthogonal to each other. An arrow Z indicates an up-down direction (direction of gravity). An X direction is a widthwise direction (left-right direction; widthwise direction of a print medium) of the printing apparatus 1. A Y direction is a depthwise direction (front-back direction) of the printing apparatus 1.

"Printing" includes not only a case of forming meaningful information, such as characters and shapes, but also a case of forming images, designs, patterns, and the like, regardless of whether they are meaningful or meaningless, on a print medium or processing a print medium, and it does not matter whether they are visualized such that a human can visually perceive them. In addition, although in the present embodiment a sheet-like paper is assumed as a "print medium", the "print medium" may be cloth, a plastic film, or the like.

The printing apparatus 1 includes a feeding unit 2, a conveyance unit 3 for conveying a print medium, and a discharging unit 4. The feeding unit 2 includes a tray 2*a* on which sheet-like print media are stacked and a mechanism (not illustrated) for feeding a print medium. The feeding mechanism includes, for example, a feeding roller for feeding a print medium on the tray 2*a* and a feeding motor, which is a driving source for rotating the feeding roller.

The conveyance unit 3 is a mechanism for conveying a print medium fed from the feeding unit 2 in the Y direction (sub-scanning direction). The conveyance unit 3 includes a conveyance roller 3*a* and a conveyance motor (not illustrated), which is a driving source for rotating the conveyance roller 3*a*. A pinch roller 3*b* is pressed against the conveyance roller 3*a*, and a print medium is nipped by a nip portion therebetween. The print medium is conveyed over a platen PT by rotation of the conveyance roller 3*a*.

The discharging unit 4 is a mechanism for further conveying a print medium conveyed from the conveyance unit 3 in the Y direction (sub-scanning direction). The discharging unit 4 includes a discharging roller; a conveyance motor, which is a driving source for rotating the discharging roller, and a spur, which is in contact with the discharging roller, (all not illustrated) and discharges the print medium to a front side of the printing apparatus 1.

Containers 7Bk, 7C, 7M, and 7Y (hereinafter, referred to as container(s) 7 when being collectively referred to or when not being distinguished from each other) are ink tanks in which liquid ink is held. In a case of the present embodiment, the containers 7 are stationary containers fixed to the printing apparatus 1. When a remaining amount of ink decreases, a user replenishes the container 7 with ink without removing the container 7 from the printing apparatus 1. Different types of ink are held in the four containers 7. In a case of the present embodiment, black ink is held in the container 7Bk, cyan ink is held in the container 7C, magenta ink is held in the container 7M, and yellow ink is held in the container 7Y. The types of ink are not limited to four types as in the present embodiment and may be one type or a plurality of types aside from four types, and the number of the containers 7 need only be greater than or equal to a number that corresponds to the number of types of ink.

The printing apparatus 1 includes a carriage 5. The carriage 5 is a support member for supporting a printhead 10Cr (not illustrated in FIG. 1) and a printhead 10Bk (hereinafter, referred to as printhead(s) 10 when being collectively referred to or when not being distinguished from each other). The carriage 5 is covered from above by a headset cover 8. The printhead 10 of the present embodiment is a printhead that performs printing by discharging ink supplied from the container 7 onto a print medium. The printhead 10 includes a discharge surface 101 (see FIGS. 3 and 4 and the like) on which a plurality of nozzles for discharging ink are formed. The discharge surface 101 is arranged so as to face the platen PT. Each nozzle is provided with, for example, an electro-thermal conversion element (heater), and the electro-thermal conversion element causes ink to bubble by being heated by energization and causes ink to be discharged with that bubble energy. A structure may be that in which ink is discharged by a piezoelectric element instead of an electro-thermal conversion element.

The carriage 5 is moved back and forth in the X direction (main scanning direction) by a driving unit 6. The driving unit 6 includes a driving pulley and a driven pulley (only a driven pulley 6*b* is illustrated in FIG. 1), which are arranged to be spaced apart in the X direction; an endless belt 6*c*, which is wound around these pulleys; and a carriage motor 6*a*, which is a driving source for rotating the driving pulley. The carriage 5 is connected to the endless belt 6*c*, and the carriage 5 is moved in the X direction by causing the endless belt 6*c* to run.

An image is printed by discharging ink from the printheads 10 onto a print medium on the platen PT in a process of movement of the carriage 5. This operation may be referred to as print scanning. A print operation is performed by alternately repeating a print medium conveyance operation by the conveyance unit 6 and print scanning. That is, an image is printed on a print medium by the conveyance unit 6 intermittently conveying the print medium and print scanning being performed when conveyance of the print medium is stopped.

As described above, the printing apparatus 1 according to the present embodiment is a serial inkjet printing apparatus in which the printheads 10 are mounted in the carriage 5, which moves back and forth in the X direction. However, the present invention is also applicable to another printing apparatus, such as an inkjet printing apparatus that includes a printhead that is a so-called full-line head, which is provided with a plurality of nozzles for discharging liquid onto a region that corresponds to a width of a print medium.

"2. Structure of Surroundings of Carriage"

Figure 2:
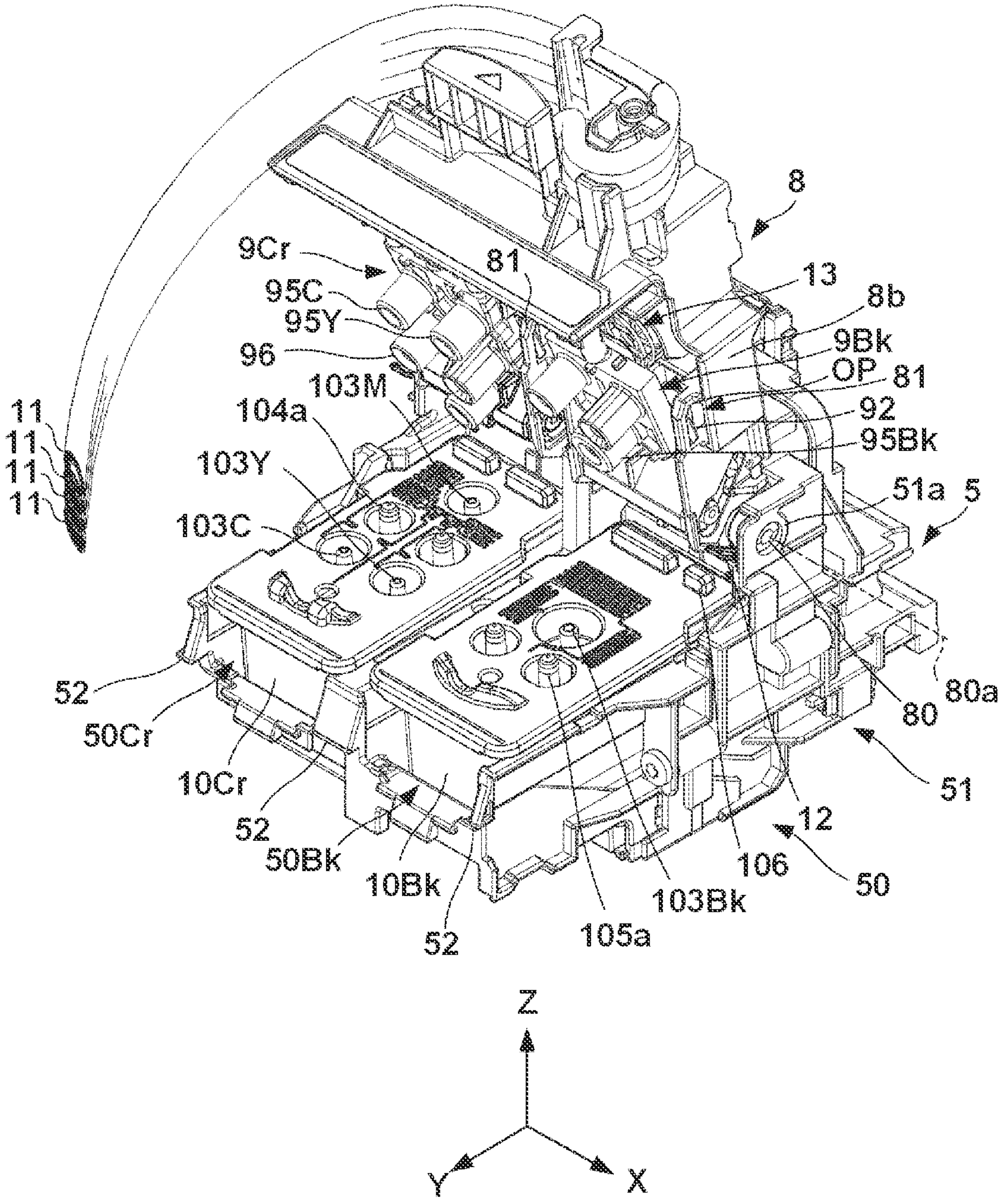
FIG. 2 is a perspective view illustrating a structure of surroundings of a carriage.
Figure 3:
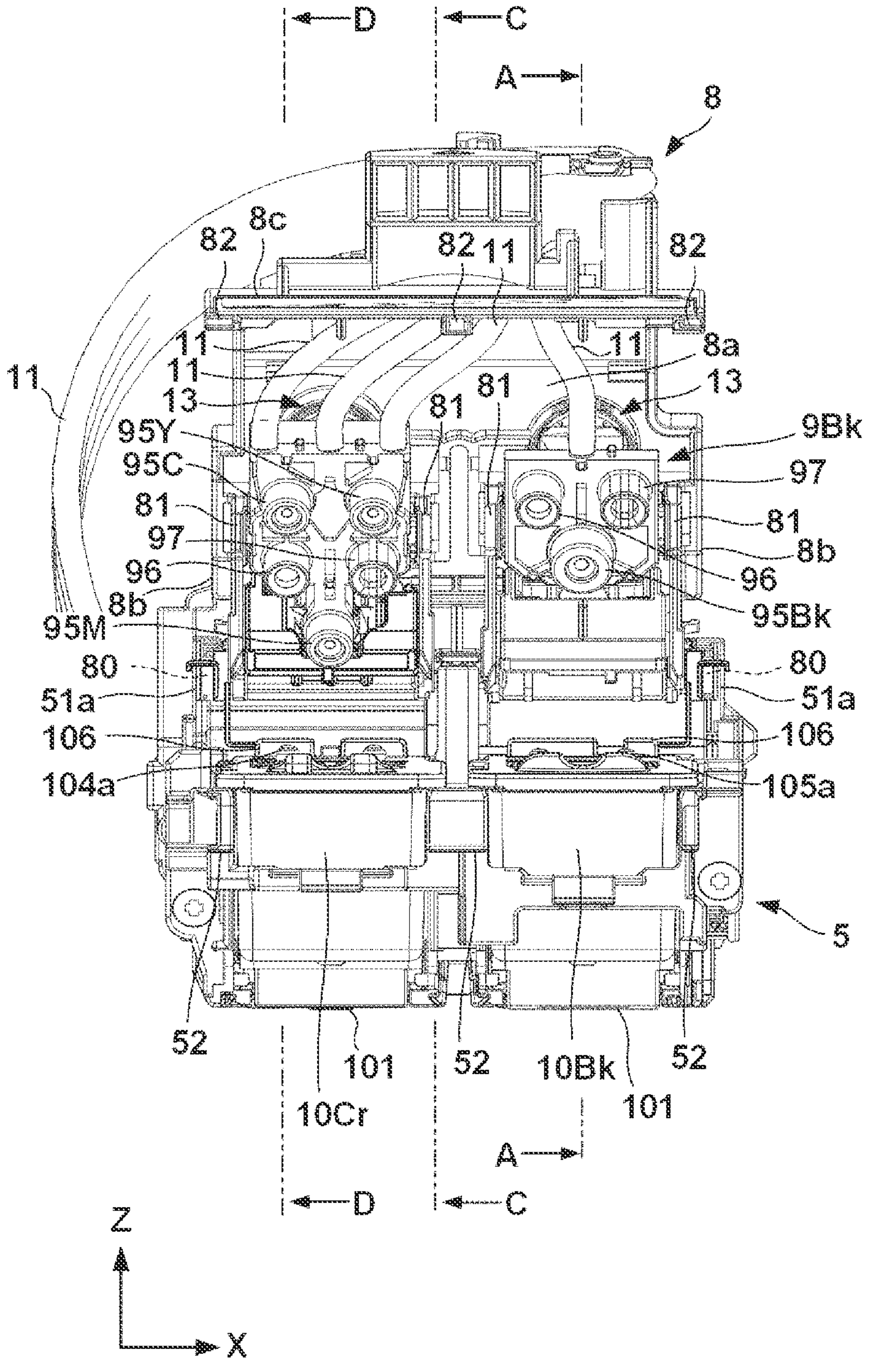
FIG. 3 is a front view illustrating the structure of the surroundings of the carriage.

A structure of surroundings of the carriage 5 will be described with reference to FIGS. 2 to 8 in addition to FIG. 1. Reference will be made mainly to FIGS. 2 and 3. FIG. 2 is a perspective view illustrating the structure of the surroundings of the carriage 5, and FIG. 3 is a front view illustrating the structure of the surroundings of the carriage 5. FIGS. 2 and 3 illustrate a state in which the headset cover 8 is positioned in an open position at which the printheads 10 can be attached or detached.

<Printhead>

In the present embodiment, the plurality of printheads 10 are supported in the carriage 5. Specifically, two types of printheads 10, the printhead 10Cr and the printhead 10Bk, are supported. The printhead 10Cr is a printhead for discharging cyan ink, magenta ink, and yellow ink. The printhead 10Bk is a printhead for discharging black ink. In the present embodiment, the printheads 10 are supported in the carriage 5 in a replaceable manner. Since the printheads 10 are replaceable, formally, there are cases where the printheads 10 and an apparatus body aside from that are referred to as the printing apparatus 1 as well as cases where the apparatus body is referred to as the printing apparatus 1.

Figure 4:
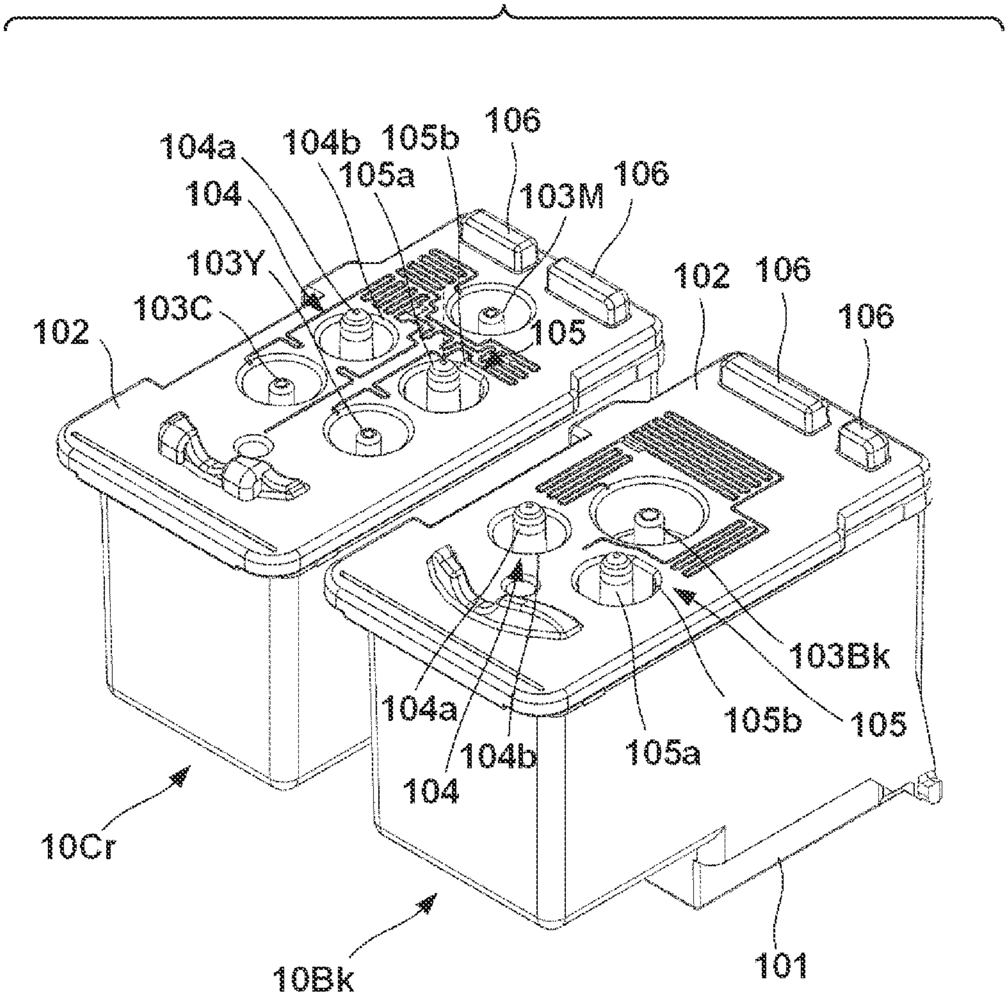
FIG. 4 is a perspective view of printheads.

Reference will also be made to FIG. 4. FIG. 4 is a perspective view of the printheads 10Cr and 10Bk. The printhead 10 has a cuboid shape as a whole, and on the bottom thereof, the discharge surface 101 is provided. An upper surface 102 of the printhead 10 is provided with the following configuration.

The upper surface 102 of the printhead 10Bk is provided with an engaging portion 106 protruding upward from the upper surface 102, a liquid introduction portion 103Bk, and orientation control portions 104 and 105. The engaging portion 106 is an engaging portion for positioning for when the printhead 10Bk is mounted in the carriage 5. The liquid introduction portion 103Bk is a portion serving as an inlet for introducing black ink held in the container 7Bk into the printhead 10Bk and is a tube member extending in an up-down direction. A circular recess is formed around the liquid introduction portion 103Bk. The orientation control portions 104 and 105 are members for changing an orientation of a connecting member 9Bk. The orientation control portion 104 includes a cylindrical (the cross-section is a circle) shaft portion 104*a* and a cylindrical tubular recess 104*b*. An end of the shaft portion 104*a* is gradually reduced in diameter. The orientation control portion 105 includes an elliptic cylindrical (the cross-section is an ellipse) shaft portion 105*a* and an elliptic tubular recess 105*b*. An end of the shaft portion 105*a* is gradually reduced in diameter.

The upper surface 102 of the printhead 10Cr is provided with an engaging portion 106 protruding upward from the upper surface 102; liquid introduction portions 103Y, 103M, and 103C; and orientation control portions 104 and 105. The engaging portion 106 is an engaging portion for positioning for when the printhead 10Cr is mounted in the carriage 5. The liquid introduction portions 103Y, 103M, and 103C are portions serving as inlets for introducing yellow ink, magenta ink, and cyan ink held in the containers 7Y, 7M, and 7C into the printhead 10Cr and are tube members extending in an up-down direction. A circular recess is formed around each of the liquid introduction portions 103Y, 103M, and 103C. The orientation control portions 104 and 105 are members for changing an orientation of a connecting member 9Cr. The orientation control portion 104 includes a cylindrical shaft portion 104*a* and a cylindrical tubular recess 104*b*. An end of the shaft portion 104*a* is gradually reduced in diameter. The orientation control portion 105 includes an elliptic cylindrical shaft portion 105*a* and an elliptic tubular recess 105*b*. An end of the shaft portion 105*a* is gradually reduced in diameter.

<Carriage and Headset Cover>

Reference will be made mainly to FIGS. 1 to 3. The carriage 5 includes a head supporting portion 50 for supporting the printheads 10 and a cover supporting portion 51 for supporting the headset cover 8 in a rotatable manner, and the head supporting portion 50 can be attached to and detached from the cover supporting portion 51. A known attach-detach structure (e.g., a bolt-fastened structure or the like) may be employed for an attach-detach structure of the head supporting portion 50 and the cover supporting portion 51. The head supporting portion 50 includes a head housing portion 50Cr for housing the printhead 10Cr and a head housing portion 50Bk for housing the printhead 10Bk. The head housing portion 50Cr and the head housing portion 50Bk are arranged side by side in the X direction; therefore, the printhead 10Cr and the printhead 10Bk are also arranged side by side in the X direction. The head supporting portion 50 includes an opening at the bottom thereof, and the respective discharge surfaces 101 of the printhead 10Cr and the printhead 10Bk are exposed to the outside (on a lower side) of the carriage 5. On a front portion of the carriage 5, a plurality of engaging portions 52 for maintaining the headset cover 8 in a closed position is provided spaced apart in the X direction.

The headset cover 8 is a rotating member that is supported by the cover supporting portion 51 of the carriage 5 in a rotatable manner and allows replacement of the printhead 10. When the headset cover 8 is in the open position illustrated in FIGS. 2 and 3, the printhead 10 can be attached to or detached from the head supporting portion 50 of the carriage 5. When the headset cover 8 is in the closed position illustrated in FIG. 1, the printhead 10 cannot be attached to or detached from the head supporting portion 50 of the carriage 5. The headset cover 8 includes an upper wall portion 8*a*, left and right side wall portions 8*b* and a front wall portion 8*c* and, as a whole, has a shape of a box whose bottom and back sides are open.

In the headset cover 8, cylindrical tubular shaft portions 80 are provided spaced apart to the left and right. One shaft portion 80 protrudes in one direction of the X direction from one side wall portion 8*b* of the headset cover 8, and the other shaft portion 80 protrudes in the opposite direction of the X direction from the other side wall portion 8*b*. Regarding the cover supporting portion 51 of the carriage 5, on each of the left and right side wall portions thereof, a shaft supporting portion 51*a* for supporting the shaft portion 80 is provided. In a case of the present embodiment, the shaft supporting portion 51*a* is a through hole, and the shaft portion 80 is inserted in an axial direction thereof. The shaft supporting portion 51*a* may be a blind hole. As described above, in the present embodiment, two sets of the shaft portion 80 and the shaft supporting portion 51*a* are provided spaced apart in an axial direction (X direction), and the headset cover 8 is rotatable, with respect to the carriage 5, around a rotation center line 80*a*, which is the center of the shaft portion 80. In a case of the present embodiment, a direction of the rotation center line 80*a* is the X direction.

Figure 7:
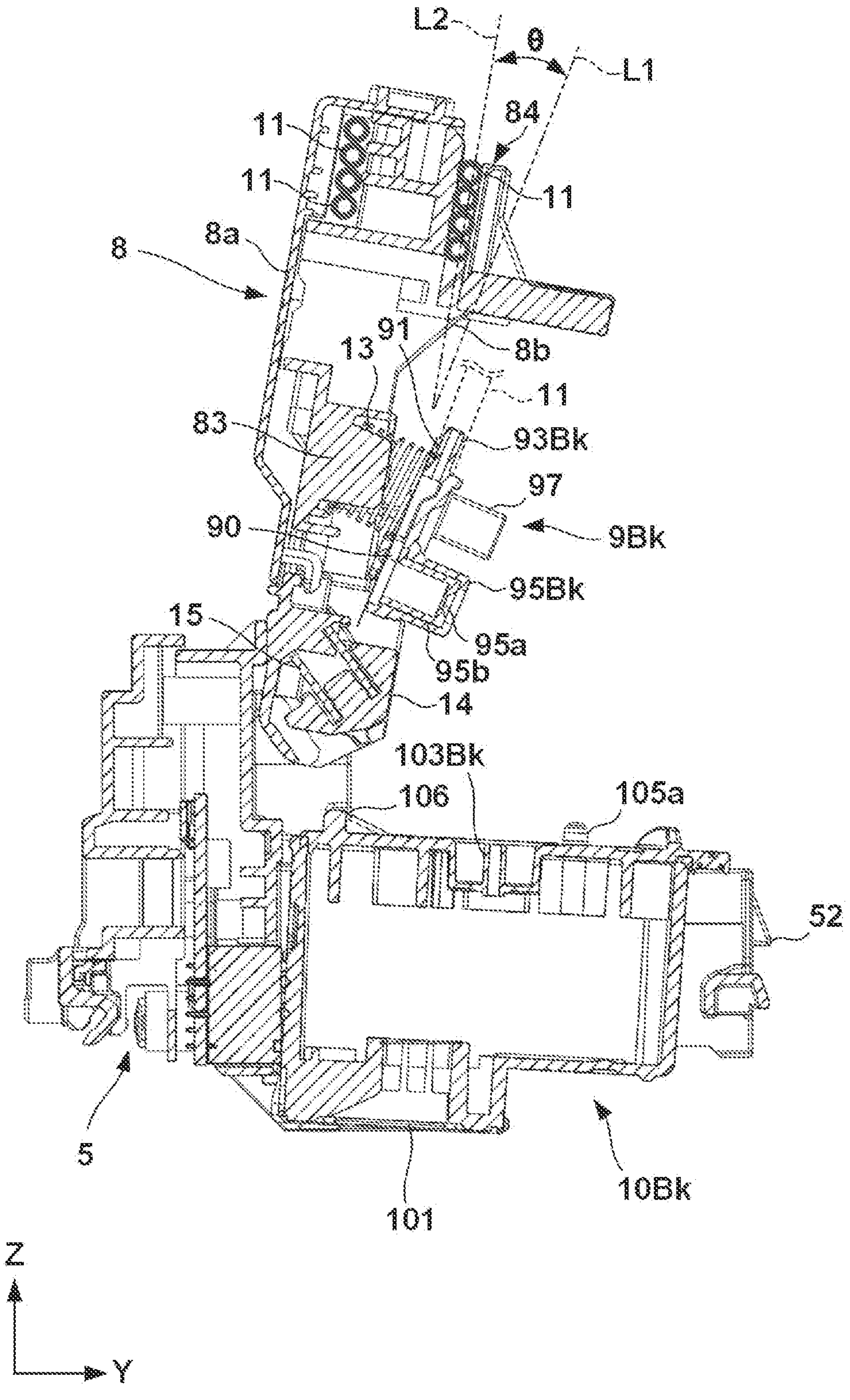
FIG. 7 is a cross-sectional view taken along a line A-A of FIG. 3.
Figure 8:
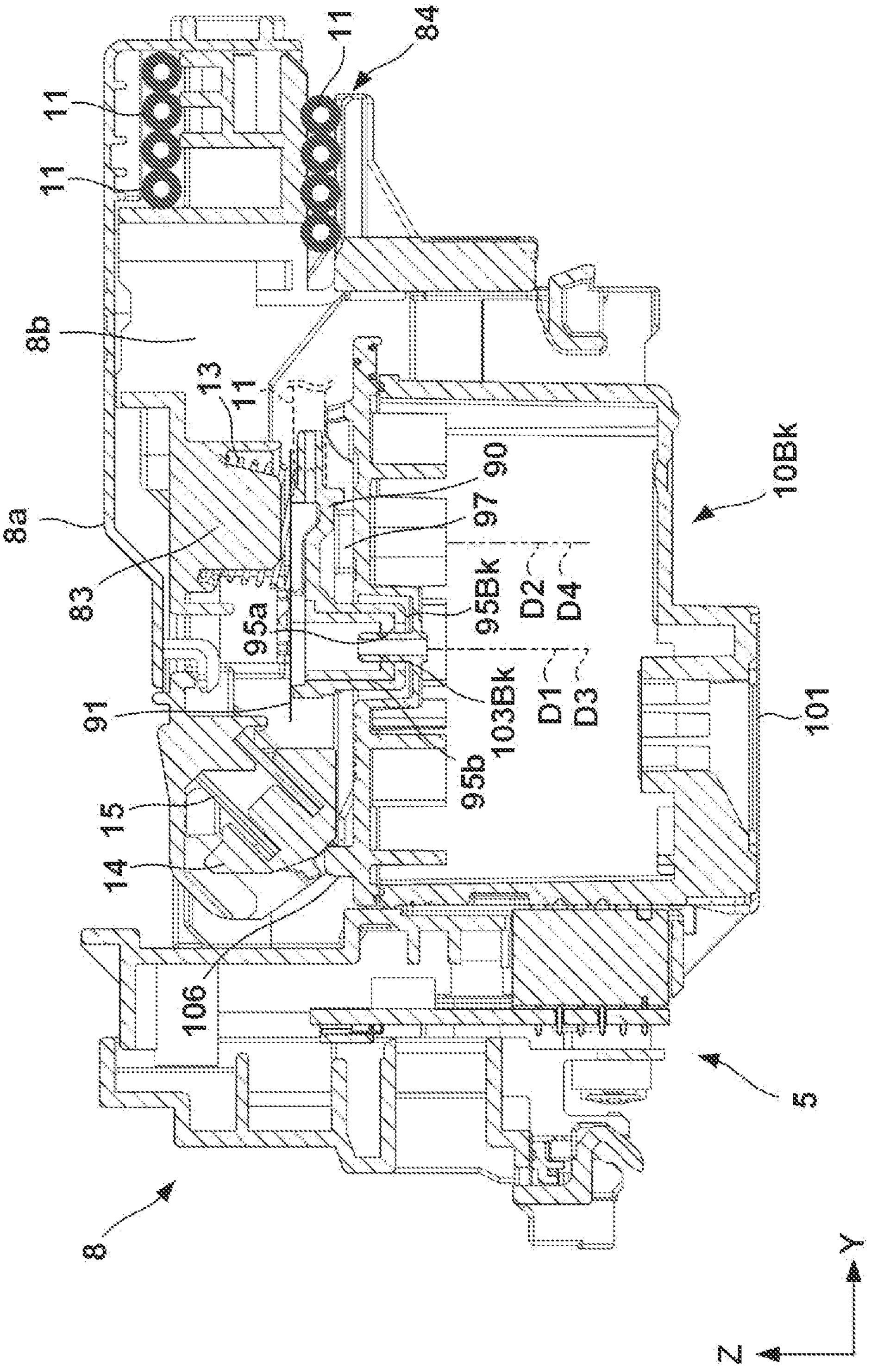
FIG. 8 is a cross-sectional view illustrating a state in which a headset cover is in a closed position.

In a vicinity of each shaft portion 80, an elastic member 12 for biasing the headset cover 8 to be in the open position is provided. In a case of the present embodiment, the elastic member 12 is a torsion coil spring through which the shaft portion 80 is inserted. The front wall portion 8*c* of the headset cover 8 is provided with a plurality of engaging portions 82, which correspond to the engaging portions 52 of the carriage 5. FIG. 7 is a cross-sectional view taken along the line A-A of FIG. 3 and illustrates the headset cover 8 in a state of the open position. FIG. 8 is a cross-sectional view taken along a line that is equivalent to the line A-A of FIG. 3 and illustrates the headset cover 8 in a state of the closed position. The engaging portion 52 and the engaging portion 82 each have a wedge shape, and the headset cover 8 is maintained in the closed position by the engaging portion 82 being engaged with the engaging portion 52. When engagement between the engaging portion 52 and the engaging portion 82 is released, the headset cover 8 is automatically rotated to the open position by biasing of the elastic member 12.

<Connecting Member>

Reference is made mainly to FIGS. 1 to 3, 7, and 8. In the headset cover 8, the connecting members 9Cr and 9Bk (hereinafter, referred to as connecting member(s) 9 when being collectively referred to or when not being distinguished from each other) are held. The connecting member 9 is arranged on an inner side of the upper wall portion 8*a*. When the headset cover 8 is positioned in the closed position (FIG. 8), a form is such that the upper wall portion 8*a* covers the printhead 10 from above, and in terms of this form, the upper wall portion 8*a* can be referred to as a cover portion. When the headset cover 8 is positioned in the closed position (FIG. 8), the connecting member 9 is positioned between the upper wall portion 8*a* and the printhead 10.

The connecting member 9 is held by a plurality of holding portions 81 of the headset cover 8 such that the orientation can be changed. Each holding portion 81 is formed so as to protrude inwardly from the upper wall portion 8*a*, and each connecting member 9 is held by a pair of holding portions 81 spaced apart to the left and right. In a case of the present embodiment, a total of four holding portions 81 are provided in the headset cover 8 in order to hold the two connecting members 9.

The connecting member 9 is a member for relaying the printhead 10 and a tube 11. A total of four tubes 11 are provided for each type of ink, and each tube 11 is connected to the corresponding container 7Bk, 7C, 7M or 7Y. Each tube 11 is a flexible, long member and forms an ink supply path. Regarding the four tubes, midway portions thereof are held and fixed in a groove-shaped holding portion 84 provided in the headset cover 8.

Figure 5:
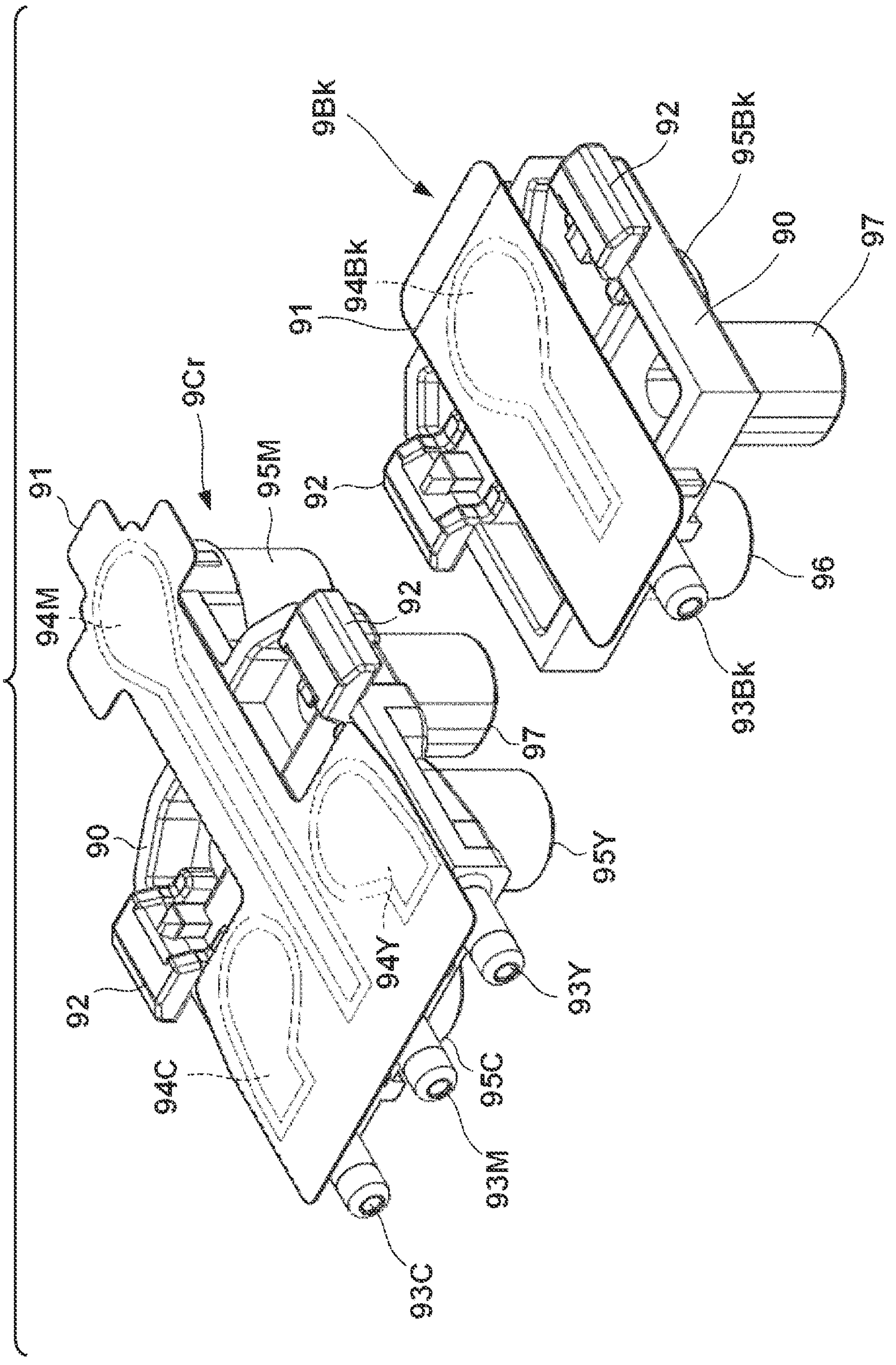
FIG. 5 is a perspective view of connecting members.
Figure 6:
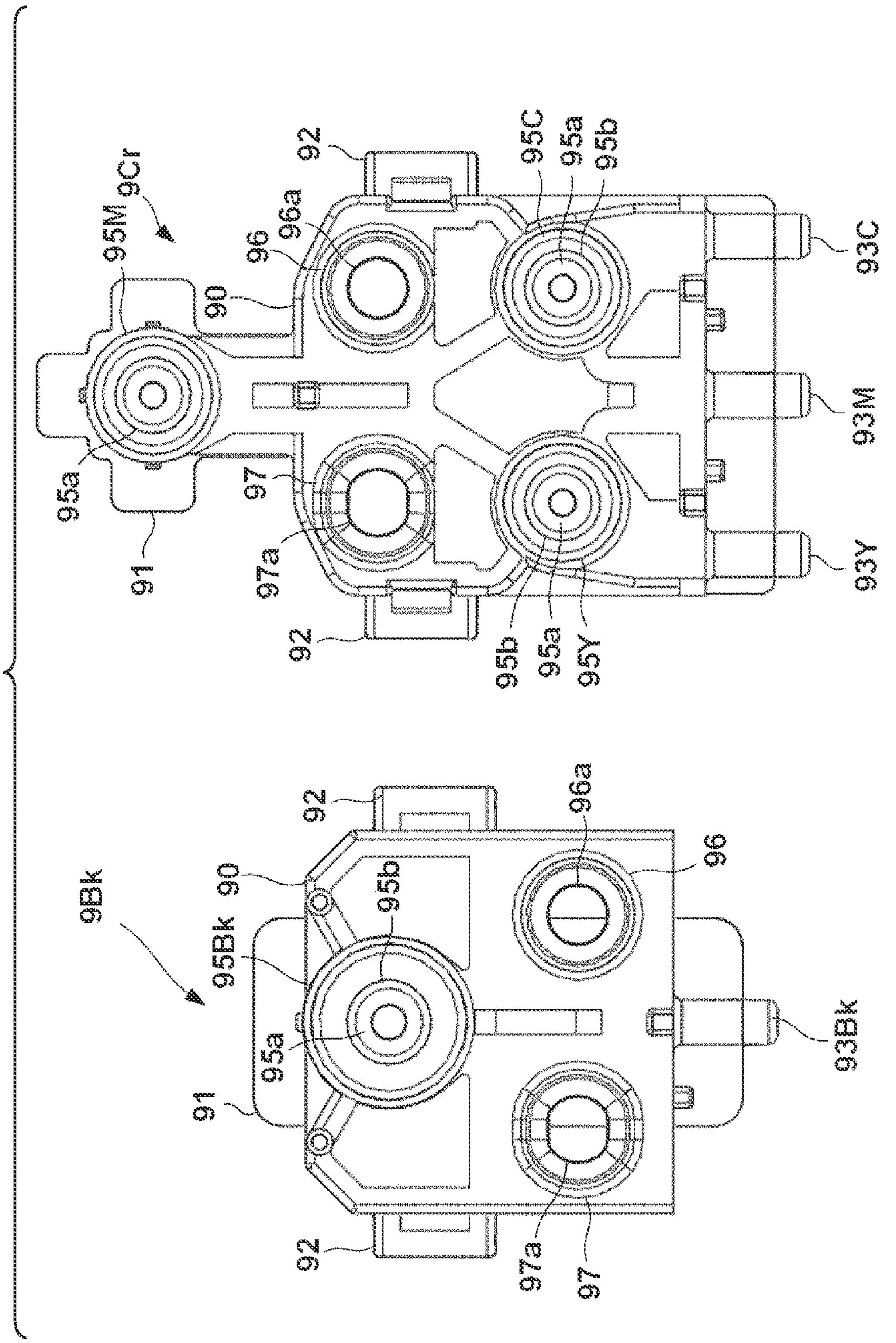
FIG. 6 is a bottom view of the connecting members.

Reference will also be made to FIGS. 5 and 6. FIG. 5 is a perspective view of the connecting members 9Cr and 9Bk. FIG. 6 is a bottom view of the connecting members 9Cr and 9Bk.

The connecting member 9Bk includes a body 90 and a sealing member 91. The body 90 includes, in an integrated manner, an inflow portion 93Bk provided at a front end thereof, a pair of claw portions 92 provided on left and right side portions thereof, and a connecting portion 95Bk and engaging portions 96 and 97 provided on a bottom surface thereof. The tube 11 that forms a liquid supply path for black ink is connected to the inflow portion 93Bk. The connecting portion 95Bk is a member that is connected to the liquid introduction portion 103Bk of the printhead 10Bk. The connecting portion 95Bk of the present embodiment is a tubular member, and a connecting port 95*a* into and from which the liquid introduction portion 103Bk is inserted and removed is formed. An elastic member 95*b* is provided on an inner circumferential surface of the connecting portion 95Bk (FIGS. 7 and 8). The elastic member 95*b* is a sealing elastomer for sealing the connecting port 95*a* and the liquid introduction portion 103Bk and, for example, is formed so as to be integrated with the connecting portion 95Bk.

A groove-shaped relay path 94Bk for joining the inflow portion 93Bk and the connecting portion 95Bk is formed on an upper surface of the body 90. A sealing member 91 is, for example, a sheet-like film that is welded to the upper surface of the body 90, and the relay path 94Bk is sealed by the sealing member 91. When the connecting portion 95Bk and the liquid introduction portion 103Bk are connected, the liquid supply path of the tube 11 and the liquid introduction portion 103Bk are joined, and black ink is supplied from the container 7Bk to the printhead 10Bk via the tube 11 and the relay path 94Bk.

The pair of claw portions 92 are plate-like members and protrude from the body 90 in a left-right direction (direction of the rotation center line 80*a*) in a plan view of the connecting member 9Bk. The holding portion 81 includes an opening OP (FIG. 2). A surface area of the opening OP is larger than a cross-sectional surface area of the claw portion 92. By the claw portions 92 being inserted into the openings OP, the connecting member 9Bk is held in the headset cover 8 such that the orientation can be changed. The engaging portions 96 and 97 correspond to the orientation control portions 104 and 105 of the printhead 10Bk; the engaging portion 96 is arranged so as to engage with the orientation control portion 104, and the engaging portion 97 is arranged so as to engage with the orientation control portion 105. The engaging portions 96 and 97 are tubular members having holes 96*a* and 97*a*; the engaging portion 96 has a cylindrical tubular shape corresponding to a shape of the orientation control portion 104, and the engaging portion 97 has an elliptic tubular shape corresponding to a shape of the orientation control portion 105.

The connecting member 9Cr will be described. A basic structure of the connecting member 9Cr is the same as that of the connecting member 9Bk. The connecting member 9Cr includes a body 90 and a sealing member 91. The body 90 of the connecting member 9Cr includes, in an integrated manner, inflow portions 93C, 93M, and 93Y provided at a front end thereof, a pair of claw portions 92 provided on left and right side portions thereof, and connecting portion 95C, 95M, and 95Y and engaging portions 96 and 97 provided on a bottom surface thereof. The tube 11 that forms a liquid supply path for cyan ink, the tube 11 that forms a liquid supply path for magenta ink, and the tube 11 that forms a liquid supply path for yellow ink are connected to the inflow portions 93C, 93M, and 93Y, respectively.

The connecting portions 95C, 95M, and 95Y are members that are connected to the liquid introduction portions 103C, 103M, and 103Y of the printhead 10Cr. The connecting portions 95C, 95M, and 95Y of the present embodiment are tubular members, and respective connecting ports 95*a* into and from which the liquid introduction portions 103C, 103M, and 103Y are inserted and removed are formed. The connecting portions 95Bk, 95Y, 95M, and 95C are referred to as connecting portion(s) 95 when being collectively referred to or when not being distinguished from each other.

An elastic member 95*b* is provided on respective inner circumferential surfaces of the connecting portions 95C, 95M, and 95Y. The elastic member 95*b* is a sealing elastomer for sealing the connecting port 95*a* and the respective liquid introduction portions 103C, 103M, and 103Y, for example, are formed so as to be integrated with the connecting portions 95C, 95M, and 95Y.

Groove-shaped relay paths 94C, 94M, and 94Y for joining the inflow portions 93C, 93M, and 93Y and the connecting portions 95C, 95M, and 95Y are formed on an upper surface of the body 90 of the connecting member 9Cr. A sealing member 91 is, for example, a sheet-like film that is welded to the upper surface of the body 90, and the relay paths 94C, 94M, and 94Y are sealed by the sealing member 91. When the connecting portion 95C and the liquid introduction portion 103C are connected, the liquid supply path of the tube 11 and the liquid introduction portion 103C are joined, and cyan ink is supplied from the container 7C to the printhead 10Cr via the tube 11 and the relay path 94C. When the connecting portion 95M and the liquid introduction portion 103M are connected, the liquid supply path of the tube 11 and the liquid introduction portion 103M are joined, and magenta ink is supplied from the container 7M to the printhead 10Cr via the tube 11 and the relay path 94M. When the connecting portion 95Y and the liquid introduction portion 103Y are connected, the liquid supply path of the tube 11 and the liquid introduction portion 103Y are joined, and yellow ink is supplied from the container 7Y to the printhead 10Cr via the tube 11 and the relay path 94Y.

The pair of claw portions 92 of the connecting member 9Cr are plate-like members and protrude from the body 90 in a left-right direction (direction of the rotation center line 80*a*) in a plan view of the connecting member 9Cr. Similarly to the connecting member 9Bk, by the claw portions 92 being inserted into the openings OP, the connecting member 9Cr is held in the headset cover 8 in a manner in which the orientation can be changed. The engaging portions 96 and 97 correspond to the orientation control portions 104 and 105 of the printhead 10Cr; the engaging portion 96 is arranged so as to engage with the orientation control portion 104, and the engaging portion 97 is arranged so as to engage with the orientation control portion 105. The engaging portions 96 and 97 are both tubular members; the engaging portion 96 has a cylindrical tubular shape corresponding to a shape of the orientation control portion 104, and the engaging portion 97 has an elliptic tubular shape corresponding to a shape of the orientation control portion 105.

<Positioning Portion>

Reference will be made mainly to FIGS. 7 and 8. A positioning portion 14 is provided in the headset cover 8. The positioning portion 14 is an engaging member that is biased by an elastic member 15 in a direction in which it presses the printhead 10. In a case of the present embodiment, the elastic member 15 is a coil spring. Two sets of the positioning portion 14 and the elastic member 15 are provided, and respective sets correspond to the printheads 10Bk and 10Cr. When the headset cover 8 rotates from an open position to a closed position, the positioning portion 14 engages with the engaging portion 106 of the printhead 10, and thereby, the printhead 10 is positioned at a predetermined position of the carriage 5.

<Biasing Portion>

The printing apparatus 1 includes a biasing portion 13 for biasing the connecting member 9 to a predetermined orientation. In a case of the present embodiment, the biasing portion 13 is an elastic member provided for each of the connecting members 9Bk and 9Cr and is, in particular, a coil spring. The biasing portion 13 is loaded between the upper wall portion 8*a* of the headset cover 8 and the connecting member 9. In the headset cover 8, a shaft-shaped guide portion 83 for supporting the biasing portion 13 is provided (FIGS. 7 and 8). The biasing portion 13 is in contact with the sealing member 91 of the connecting member 9.

FIG. 7 illustrates an initial orientation of the connecting member 9Bk, and FIG. 8 illustrates a connected orientation of the connecting member 9Bk. The biasing portion 13 biases the connecting member 9Bk toward the initial orientation. The initial orientation is an orientation of the connecting member 9Bk in a state in which the connecting portion 95Bk is not connected to the liquid introduction portion 103Bk and the orientation control portions 104 and 105 and the engaging portions 96 and 97 are spaced apart. The connected orientation is an orientation in a state in which the connecting portion 95Bk is connected to the liquid introduction portion 103Bk. Although the connecting member 9Bk has been mentioned in the above description, the same applies to the connecting member 9Cr.

"3. Opening and Closing Operation of Cover"

Figure 9:
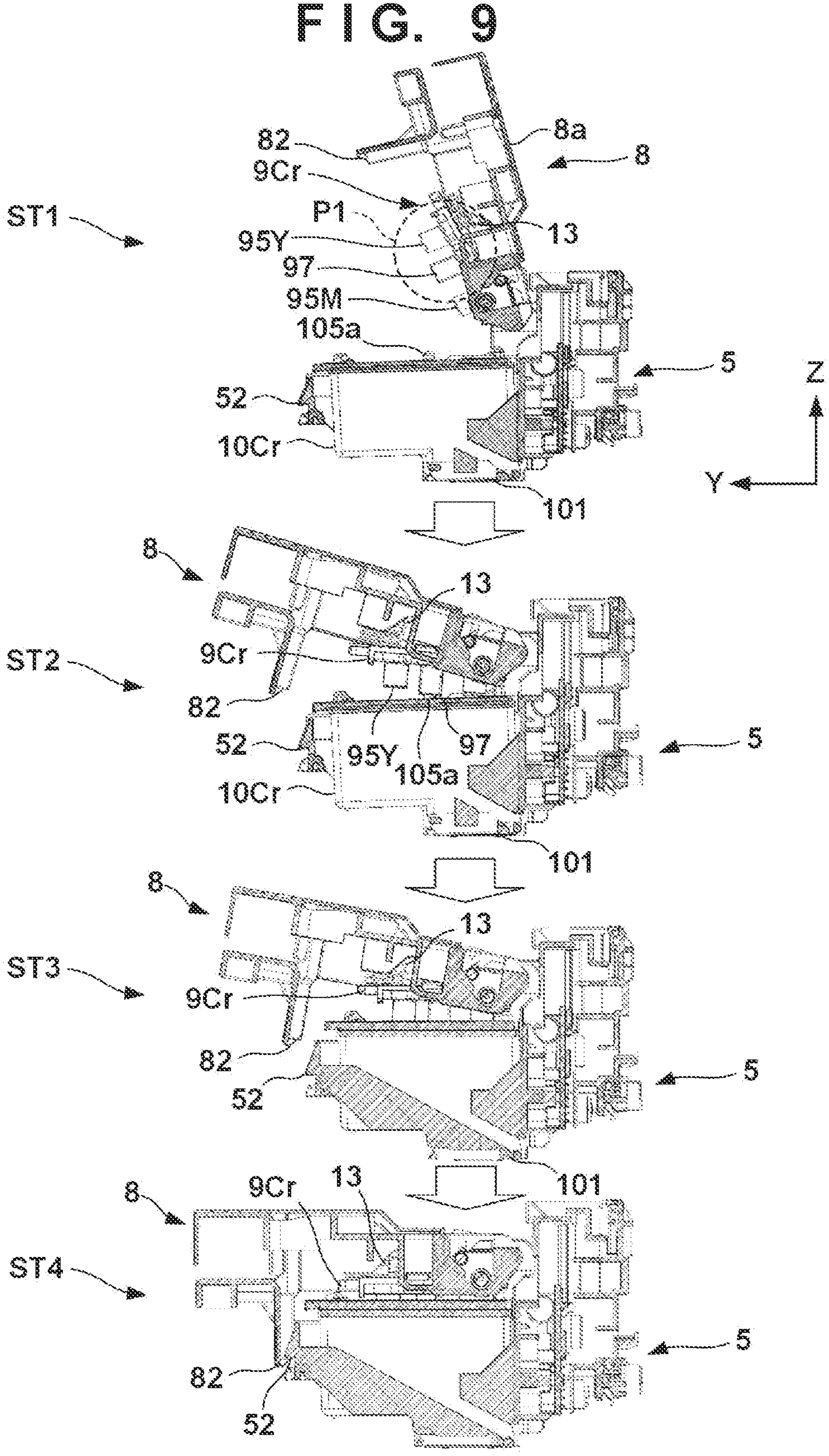
FIG. 9 is a view for explaining the operation of the headset cover and the connecting member.
Figure 10:
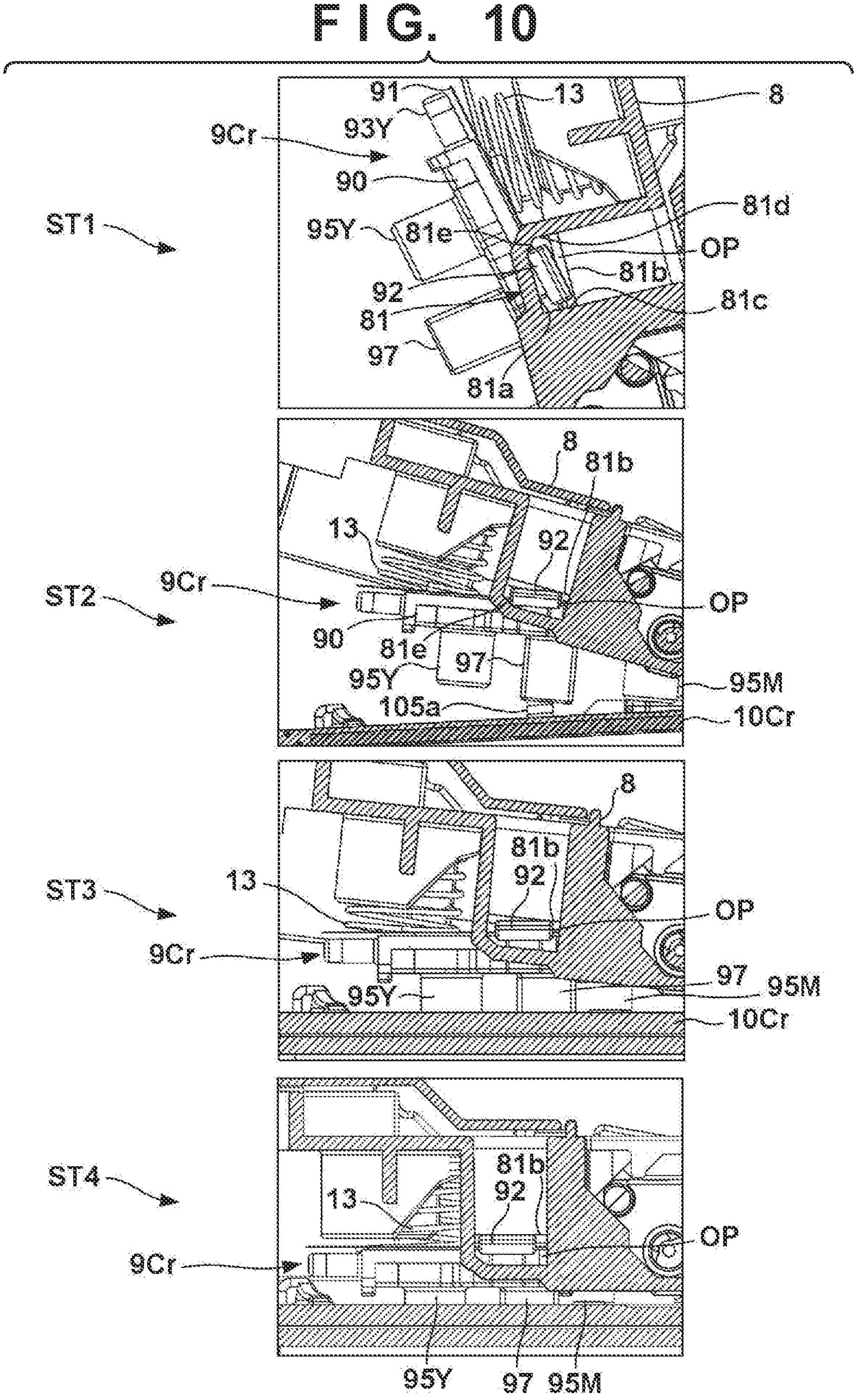
FIG. 10 is a view for explaining the operation of the headset cover and the connecting member.
Figure 11:
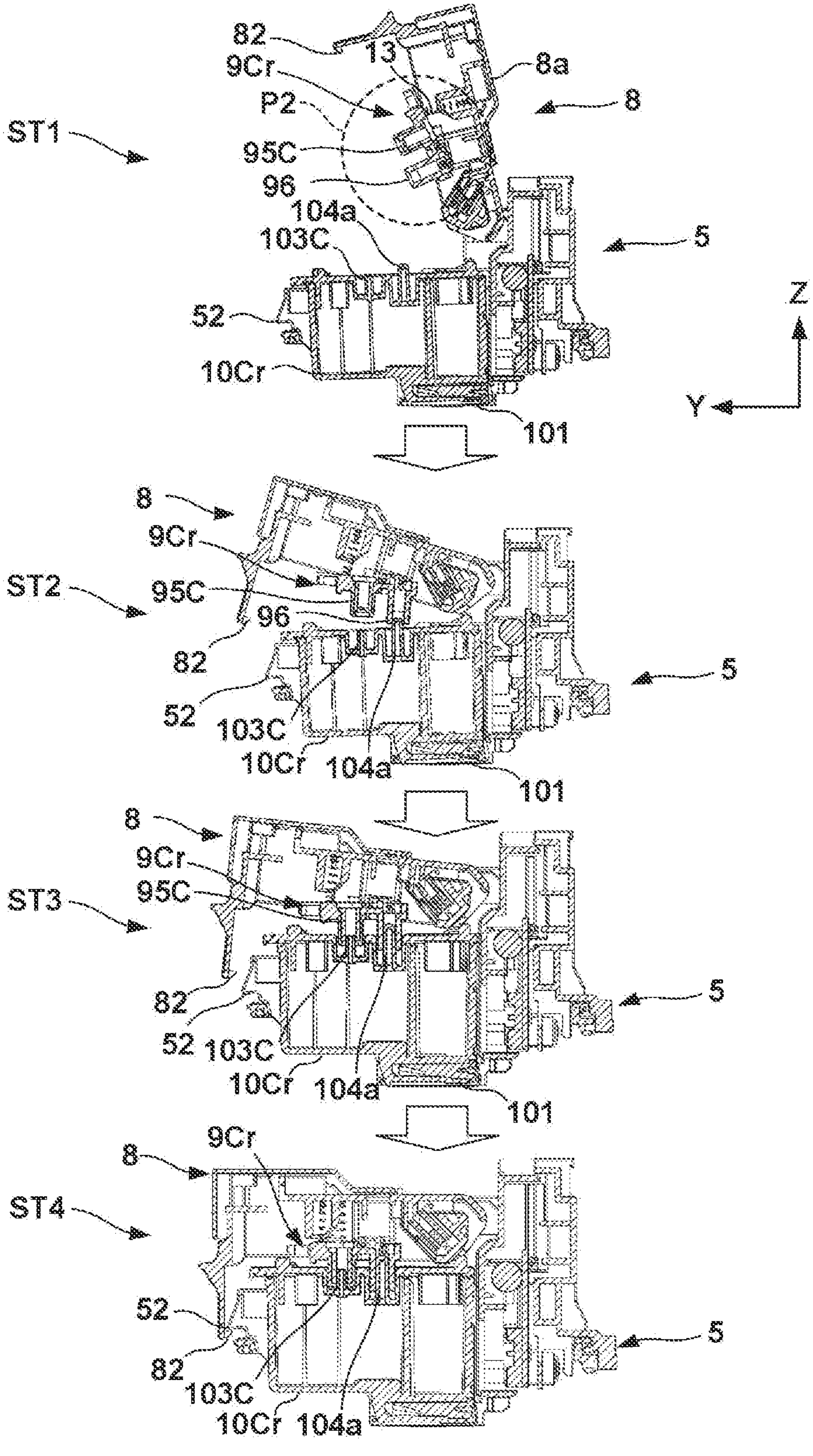
FIG. 11 is a view for explaining the operation of the headset cover and the connecting member.
Figure 12:
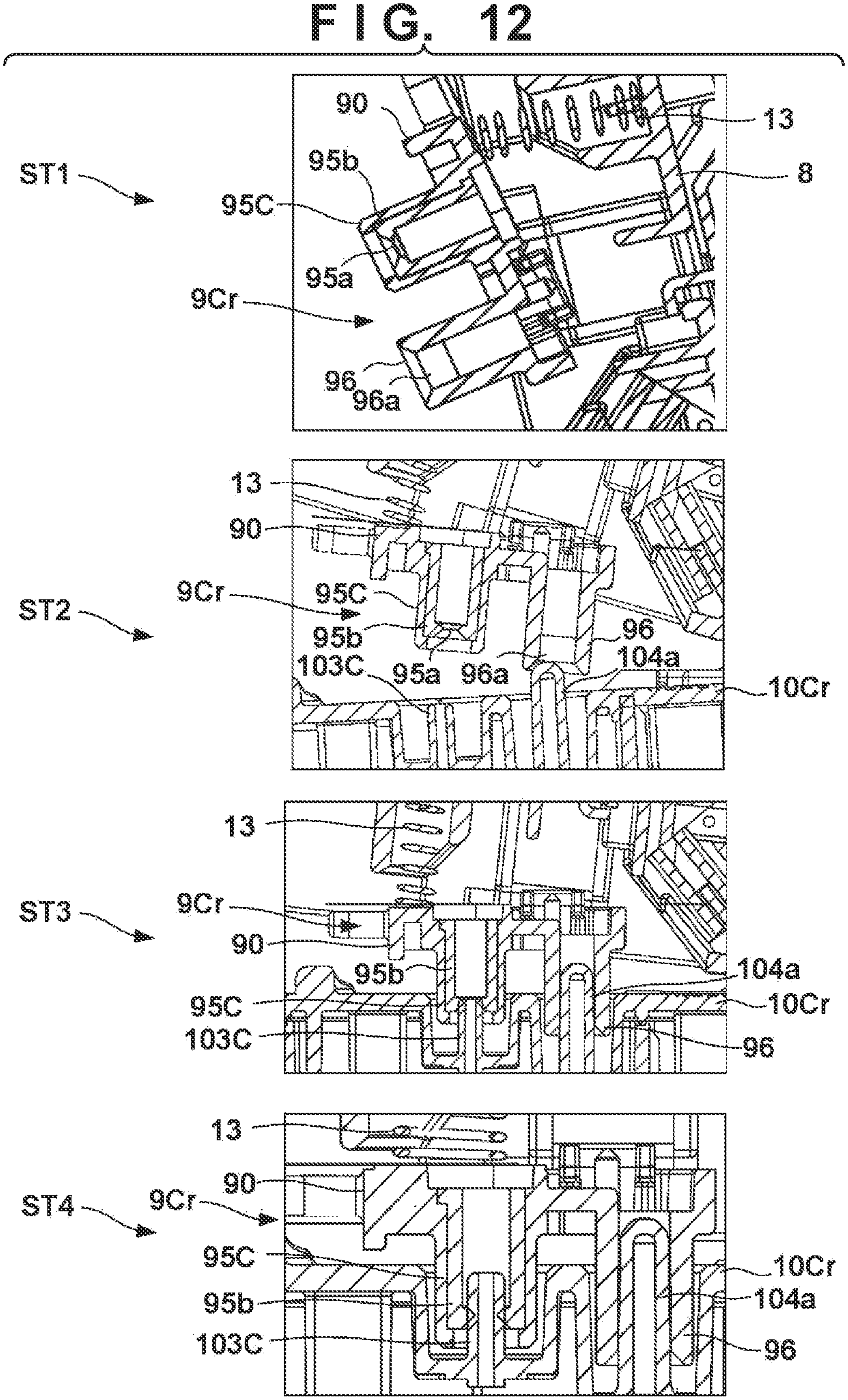
FIG. 12 is a view for explaining the operation of the headset cover and the connecting member.

A behavior and the like of the connecting member 9 when the headset cover 8 is rotated from the open position to the closed position will be described with reference to FIGS. 9 to 12. As a cross-sectional view taken along a line C-C of FIG. 3, FIG. 9 is an operation explanatory view illustrating states and the like of rotation of the headset cover 8. FIG. 10 is an enlarged view of a P1 portion of FIG. 9. As a cross-sectional view taken along a line D-D of FIG. 3, FIG. 11 is an operation explanatory view illustrating states and the like of rotation of the headset cover 8; FIG. 12 is an enlarged view of a P2 portion of FIG. 11. Respective states ST1 to ST4 of each drawing indicate the same operation timings.

The state ST1 indicates a state in which the headset cover 8 is in the open position and the state ST4 indicates a state in which the headset cover 8 is in the closed position. In the open position, the connecting member 9 is in the initial orientation, and in the closed position, the connecting member 9 is in the connected orientation. In terms of a relationship between the liquid introduction portion 103 and the connecting portion 95, the closed position can be referred to as a connected position, and the open position can be referred to as a connection released position. The states ST2 and ST3 are states that are between the state ST1 and state ST4 and in which the headset cover 8 is in the middle of rotation. FIGS. 9 to 12 illustrate transition, such as an orientation change, of the connecting member 9Cr. It is similar for transition, such as an orientation change, of the connecting member 9Bk.

In the state ST1, the connecting member 9Cr is in the initial orientation. As illustrated in the state ST1 of FIG. 10, the opening OP of the holding portion 81 is a pentagonal opening that has straight line edges 81*a* to 81*e*. The edge 81*a* and the edge 81*b* are parallel, and the edge 81*c* and the edge 81*d* are parallel. The edge 81*e* is an angled edge between the edge 81*a* and the edge 81*d*.

In the initial orientation, the claw portion 92 of the connecting member 9Cr is in contact with the edges 81*a* to 81*e* of the opening OP at a plurality of locations. Specifically, the claw portion 92 is in contact with the edges of the opening OP at three positions: the edge 81*a*, the edge 81*b*, and the edge 81*e*. By configuring a shape of the opening OP to be a pentagon rather than a quadrilateral, it is possible to improve positioning accuracy of the connecting member 9Cr while smoothly performing an orientation change of the connecting member 9Cr.

The operation of rotating the headset cover 8 from the open position to the closed position is performed, for example, by the user. When the headset cover 8 starts to rotate counterclockwise in FIGS. 9 to 12, the state enters the state ST2. At this stage, as illustrated in the state ST2 of FIGS. 10 and 12, the orientation control portion 105 and the corresponding engaging portion 97 start to engage. Specifically, the shaft portion 105*a* starts to enter the hole 97*a*. It is similar for the shaft portion 104*a* of the orientation control portion 104 and the corresponding engaging portion 96. Meanwhile, at this stage, the liquid introduction portion 103 and the connecting portion 95 are spaced apart. That is, in a process of rotation of the headset cover 8 from the open position to the closed position, the orientation control portions 104 and 105 and the engaging portions 96 and 97 start to come in contact (or engagement) before the liquid introduction portion 103 and the connecting portion 95. In addition, at the stage of the state ST2, although not illustrated, the positioning portion 14 engages with the engaging portion 106 of the printhead 10, and thereby, the printhead 10 starts being positioned at a predetermined position of the carriage 5.

When rotation of the headset cover 8 advances, the state enters the state ST3. At this stage, as illustrated in the state ST3 of FIGS. 10 and 12, engagement between the orientation control portion 105 and the corresponding engaging portion 97 advances. It is similar for the orientation control portion 104 and the corresponding engaging portion 96. When the shaft portion 105*a* enters the hole 97*a*, an axial alignment effect in which the two are positioned on the same axis takes place. That is, an axial alignment effect in which a D2 direction and a D4 direction are aligned takes place. This causes the connecting member 9Cr to change the orientation against biasing of the biasing portion 13, and the claw portion 92 begins to be spaced apart from the edges 81*a* and 81*e*. The orientation of the connecting member 9Cr is close to the connected orientation, and a D1 direction and a D3 direction also start to align; in this state, the liquid introduction portion 103 and the connecting portion 95 start to connect. In addition, by engagement between the positioning portion 14 and the engaging portion 106 of the printhead 10, the printhead 10 is positioned at a predetermined position of the carriage 5.

When rotation of the headset cover 8 advances, the state enters the state ST4. At this stage, the orientation of the connecting member 9Cr has reached the connected orientation. As described above, it is possible to automatically change the orientation of the connecting member 9Cr in a process of rotation of the headset cover 8. As illustrated in the state ST4 of FIGS. 10 and 12, engagement between the orientation control portion 105 and the corresponding engaging portion 97 is complete, and connection between the liquid introduction portion 103 and the connecting portion 95 is complete. The claw portion 92 is in contact with the edge 81*b* on the side. The engaging portion 82 is engaged with the engaging portion 52, and thereby, the headset cover 8 is maintained in the closed position. The printhead 10 is fixed to the carriage 5.

As described above, in the present embodiment, fixing of the printhead 10 and connection between the liquid introduction portion 103 and the connecting portion 95 can be simultaneously performed by rotation of the headset cover 8 from the open position to the closed position, and thereby, ink can immediately be supplied from the container 7 to the printhead 10. When engagement between the engaging portion 52 and the engaging portion 82 is released, the headset cover 8 is automatically rotated to the open position by biasing of the elastic member 12. At that time, the connecting member 9 returns to the initial orientation in an operation that is a reverse of the states ST1 to ST4, and thereby, connection between the liquid introduction portion 103 and the connecting portion 95 is released. By simply releasing engagement of the engaging portion 82 with the engaging portion 52, the user can remove the printhead 10 from the carriage 5 and thus perform a replacement operation.

In the present embodiment, the biasing portion 13 and the holding portion 81 being provided as a mechanism for changing the orientation of the connecting member 9 leads to the following advantages. That is, it is possible to change the connecting member 9 to an orientation that is suitable for connection between the liquid introduction portion 103 and the connecting portion 95 immediately before connection therebetween accompanying rotation of the headset cover 8, and thereby improve connection accuracy. In particular, it is possible to reduce a possibility that the liquid introduction portion 103 and the connecting portion 95 start to connect at an angle to each other and thus cause a connection failure.

The connecting member 9 is always biased and pressed against the edge of the opening OP by the biasing portion 13, and so, the orientation of the connecting member 9 is stabilized. It is possible to prevent the orientation of the connecting member 9 from changing to an undesired orientation during rotation of the headset cover 8, and also in terms of this, it is possible to reduce a possibility that a connection failure between the liquid introduction portion 103 and the connecting portion 95 will be caused, and thereby improve connection accuracy.

An orientation change of the connecting member 9 does not, for example, restrain rotation of the headset cover 8, and the headset cover 8 and the connecting member 9 can be smoothly displaced from each other.

"4. Structure Related to Attachment and Detachment of Headset Cover"

In a case of the present embodiment, a structure in which the shaft portions 80 protrude on the left and right sides of the headset cover 8 and are inserted into the shaft supporting portions 51*a*, which are holes provided in the cover supporting portion 51 of the carriage 5, is employed as a pivot structure of the headset cover 8. Here, in a configuration in which, when attaching and detaching the headset cover 8 to and from the carriage 5, the shaft portions 80 are inserted into and removed from the shaft supporting portions 51*a* by bending surroundings of the shaft supporting portion 51*a*, it is necessary to reduce support rigidity of the shaft supporting portion 51*a*. If support rigidity is reduced, surroundings of the shaft supporting portion 51*a* may bend due to vibrations during transportation, and thus the headset cover 8 may fall out during transportation. On the contrary, if support rigidity of the shaft supporting portion 51*a* is high, fall-out during transportation can be prevented; however, it becomes difficult to attach and detach the headset cover 8 to and from the carriage 5, and thus, assemblability during manufacturing and maintenance deteriorates. In the present embodiment, the following configuration makes it possible to achieve both rigidity of surroundings of the shaft and assemblability.

Figure 13:
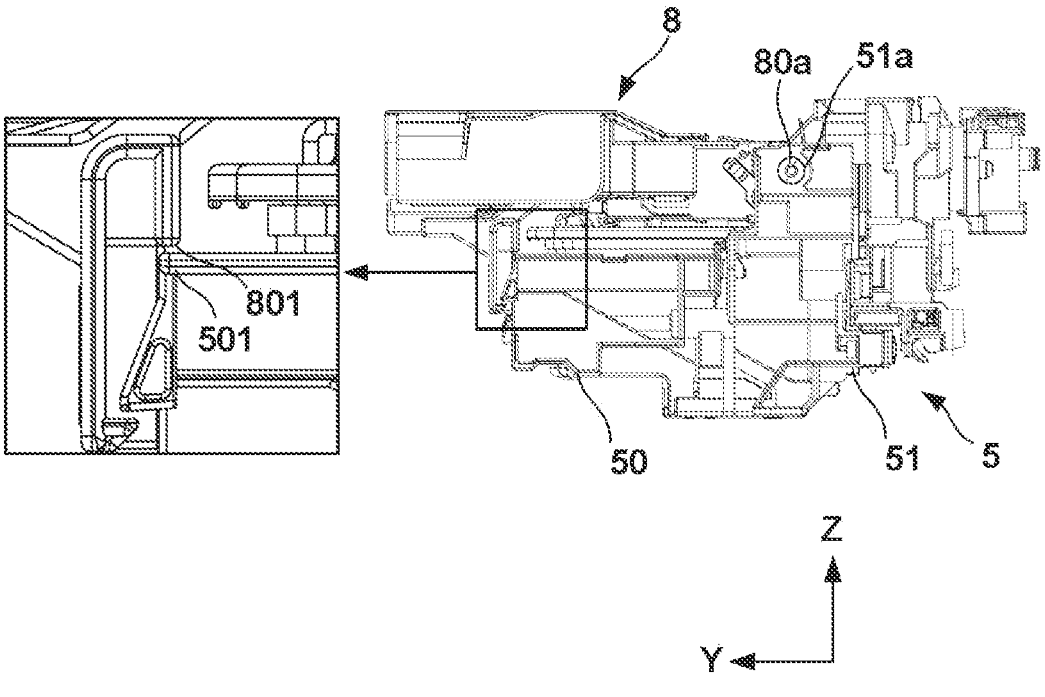
FIG. 13 is a view for explaining a rotation regulation portion.

First, an attach-detach position is designed as a rotation position of the headset cover 8. A rotation regulation structure is provided such that the headset cover 8 does not rotate to the attach-detach position during normal use. FIG. 13 is an explanatory view thereof, and the headset cover 8 is positioned in the closed position. A rotation regulation portion 501 is provided in the head supporting portion 50 of the carriage 5. The rotation regulation portion 501 is a stopper for regulating the headset cover 8 to prevent it from rotating further counterclockwise (a direction opposite to a direction from the closed position to the open position) of FIG. 13 than the closed position by being in contact with a contact portion 801 arranged in the headset cover 8.

Figure 14A:
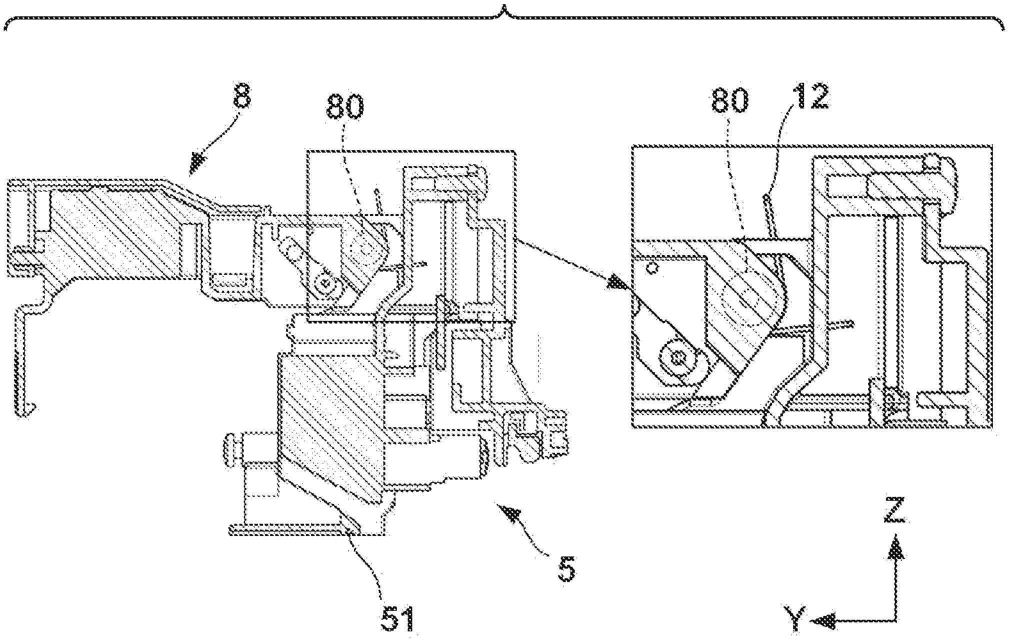
FIG. 14A is a view illustrating a state in which the headset cover is rotation-regulated.
Figure 14B:
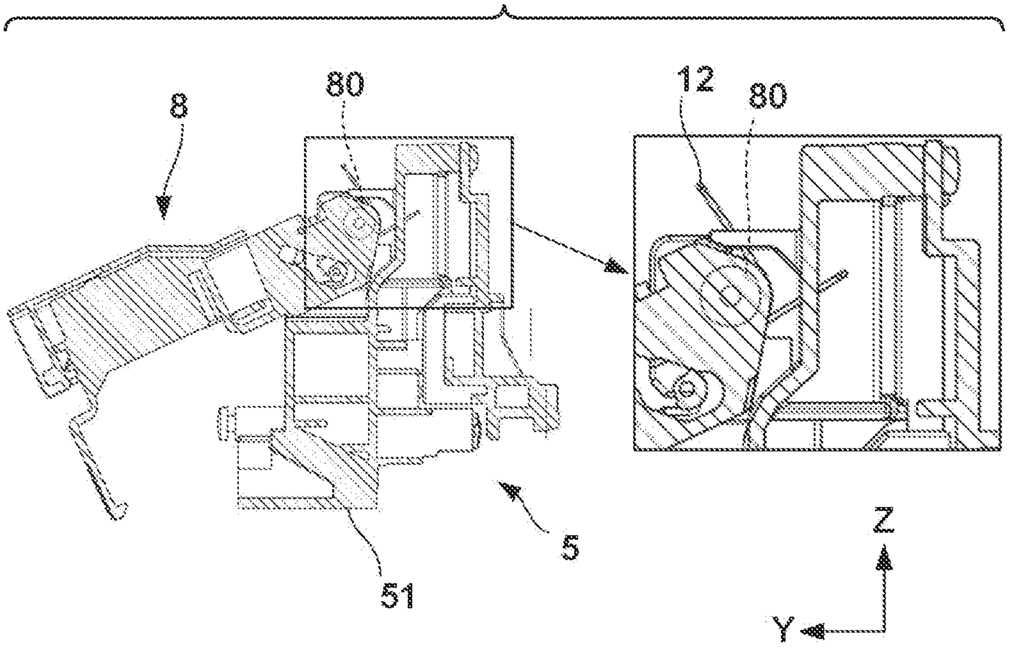
FIG. 14B is a view illustrating a state in which rotation regulation of the headset cover has been released.

This regulation can be released by removing the head supporting portion 50. FIGS. 14A and 14B are explanatory views thereof. FIG. 14A illustrates a state in which the head supporting portion 50 has been removed from the cover supporting portion 51. The headset cover 8 is positioned in the closed position. By removing the head supporting portion 50, the rotation regulation portion 501 is no longer present, and the headset cover 8 can be rotated to the attach-detach position as illustrated in FIG. 14B.

In a case of the present embodiment, the headset cover 8 is regulated by a displacement regulation structure 200, which will now be described, from being relatively displaced in the X direction with respect to the cover supporting portion 51. However, when the headset cover 8 is rotated to the attach-detach position, the headset cover 8 is allowed to relatively displace in the X direction with respect to the cover supporting portion 51 and thus can be removed.

In the present embodiment, the rotation regulation portion 501 is configured by a portion of the carriage 5 but may be a member separate from the carriage 5. However, it is possible to reduce the number of components by configuring the rotation regulation portion 501 by a portion of the carriage 5 as in the present embodiment. In addition, by using the head supporting portion 50 also as the rotation regulation portion 501, a component dedicated to the rotation regulation portion 501 is made unnecessary, and thus it is possible to further reduce the number of components.

Figure 15:
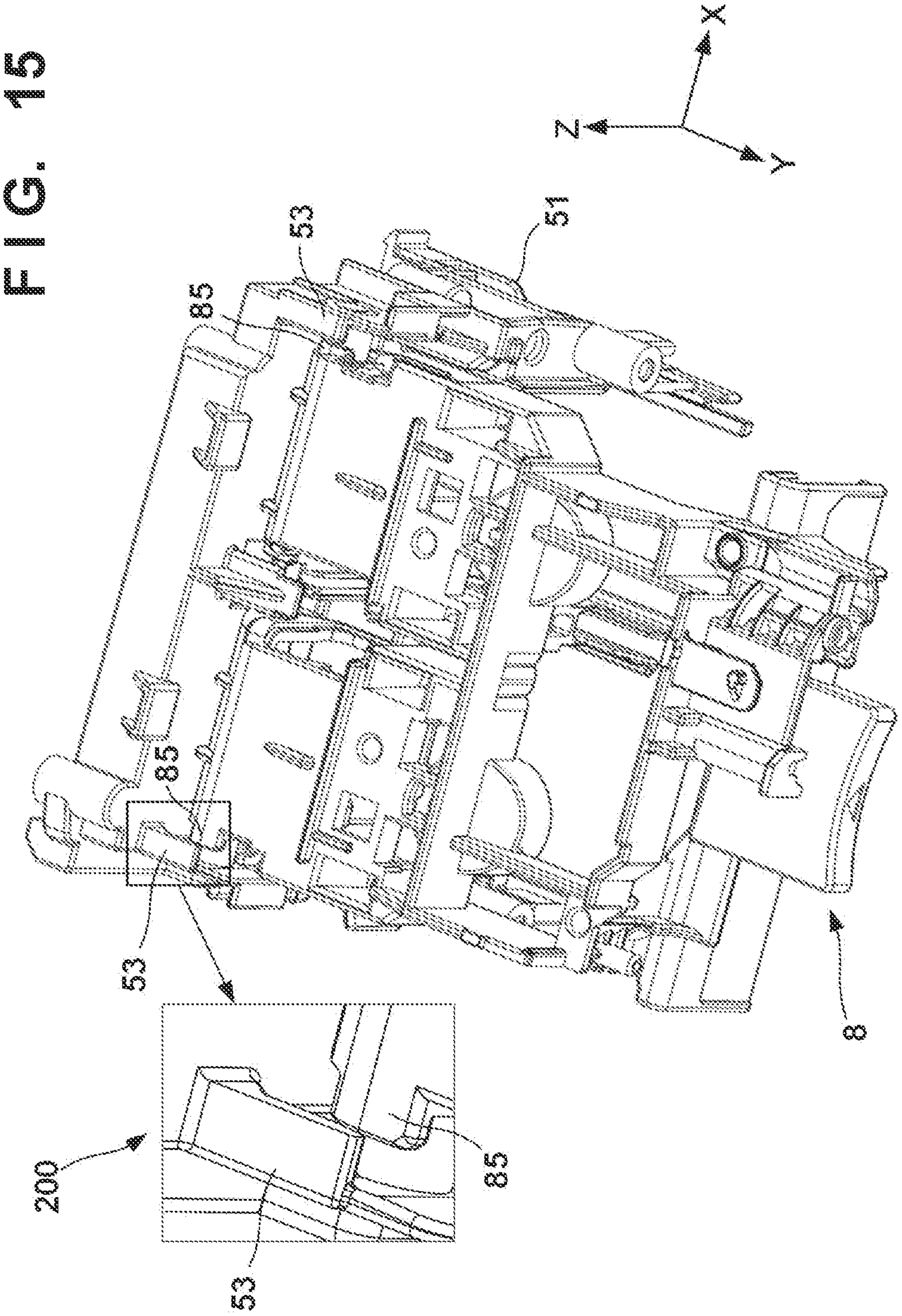
FIG. 15 is a view for explaining a displacement regulation structure.

FIG. 15 is an explanatory view of the displacement regulation structure 200. The displacement regulation structure 200 includes a regulating portion 53 provided in the cover supporting portion 51 of the carriage 5, and a regulating portion 85 provided in the headset cover 8. Two sets of regulating unit 53 and the regulating unit 85 are provided spaced apart in the X direction; one set regulates displacement in one direction of the X direction, and the other set regulates displacement in the other direction of the X direction.

The regulation portion 53 and the regulation portion 85 are contact pieces formed so as to face each other in the X direction. By these being in contact, the headset cover 8 is regulated from being relatively displaced in the X direction with respect to the cover supporting portion 51. The regulation portion 53 and the regulation portion 85 are also protruding pieces protruding further in the X direction than surroundings thereof.

In a rotation range of the headset cover 8, the regulation portion 53 and the regulation portion 85 face each other in the X direction in a rotation range during use, which includes the open position and the closed position of the headset cover 8. That is, in each rotation position between the open position and the closed position, relative displacement of the headset cover 8 in the X direction with respect to the cover supporting portion 51 is regulated. Therefore, the shaft portion 80 does not fall out from the shaft supporting portion 51*a*. The attach-detach position is a rotation position outside the rotation range during use.

Figure 16B:
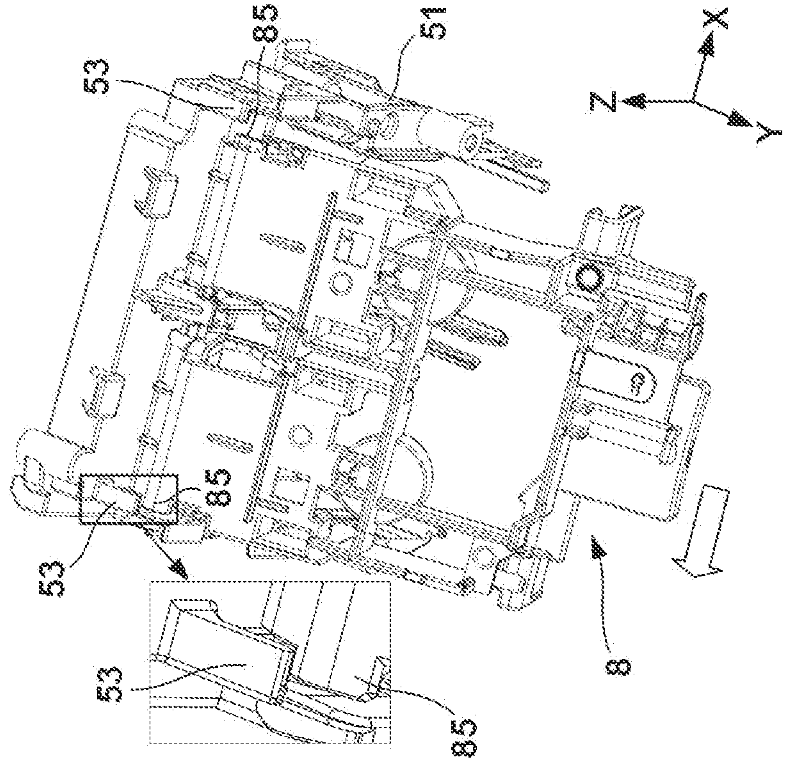
FIG. 16B is a view illustrating a state in which the headset cover has been displaced.
Figure 16A:
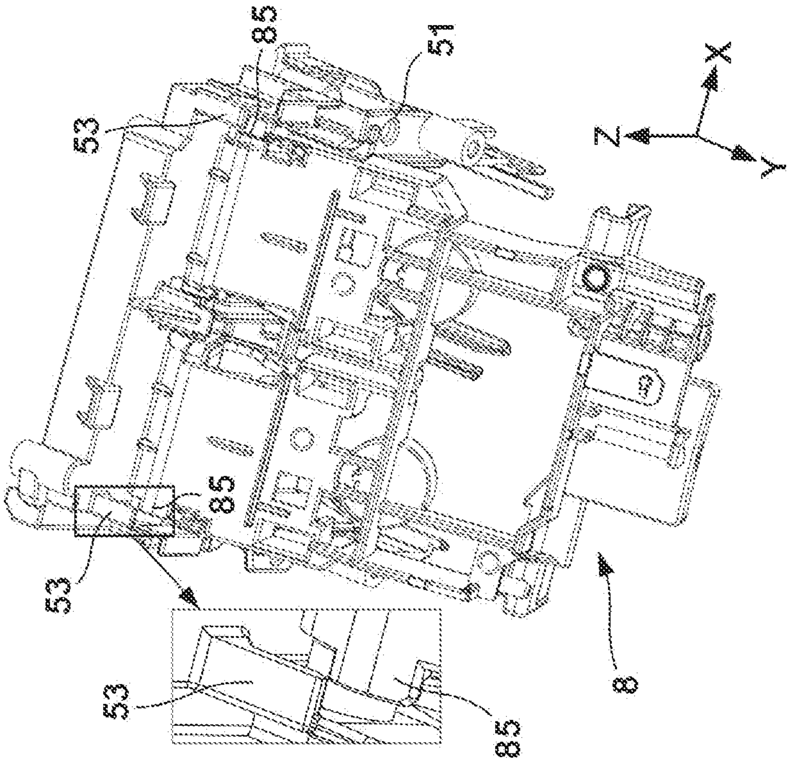
FIG. 16A is a view illustrating a state in which displacement regulation of the headset cover has been released.

Next, a state in which regulation by the displacement regulation structure 200 has been released will be described. When the head supporting portion 50 is removed as described with reference to FIGS. 14A and 14B, the headset cover 8 can be rotated to the attach-detach position. When the headset cover 8 is rotated to the attach-detach position, the regulation portion 53 and the regulation portion 85 no longer face each other in the X direction in the displacement regulation structure 200 as illustrated in FIG. 16A due to shift in the Y direction, and thereby, displacement regulation of the headset cover 8 is released. Then, as illustrated in FIG. 16B, the headset cover 8 can be displaced in the X direction with respect to the cover supporting portion 51. As a result, it becomes possible to insert and remove the shaft portion 80 into and from the shaft supporting portion 51*a*, and thereby, the headset cover 8 can be attached to and detached from the cover supporting portion 51.

Figure 17A:
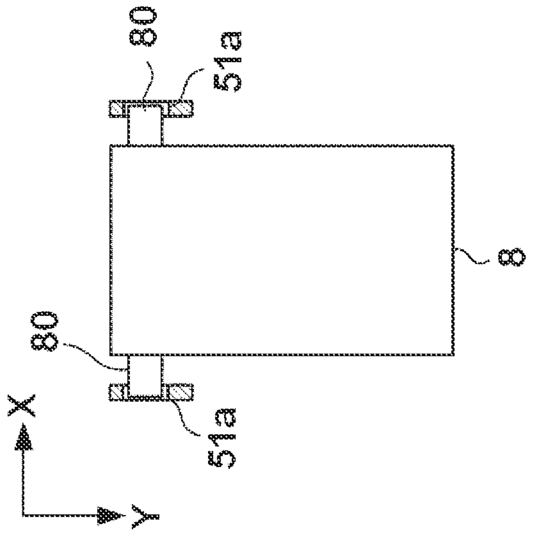
FIGS. 17A to 17C are explanatory views illustrating a procedure for removing the headset cover.
Figure 17B:
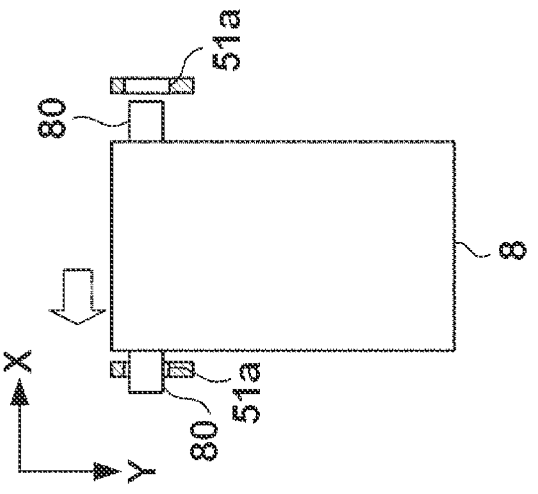
Figure 17C:
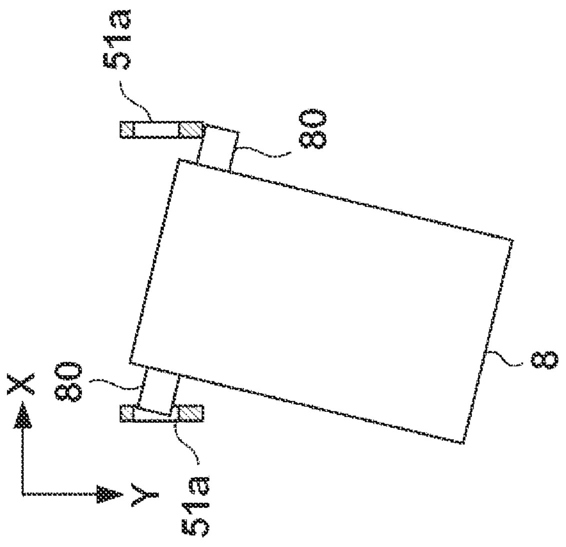

FIGS. 17A to 17C schematically illustrate a series of operations for removing the headset cover 8 from the cover supporting portion 51. FIG. 17A illustrates a state in which regulation by the displacement regulation structure 200 is taking effect. The respective left and right shaft portions 80 are inserted into and supported by the corresponding shaft supporting portions 51*a*. From this state, rotation regulation by the rotation regulation portion 501 is released by removing the head supporting portion 51, and then the headset cover 8 is rotated to the attach-detach position. Regulation by the displacement regulation structure 200 is released, and thus, as illustrated in FIG. 17B, the headset cover 8 can be displaced in the X direction with respect to the cover supporting portion 51. Among the two sets of provided shaft portion 80 and shaft supporting portion 51*a*, it is possible to remove the shaft portion 80 from the shaft supporting portion 51*a* in one set. As illustrated in FIG. 17C, by tilting the headset cover 8 at an angle, the shaft portion 80 can be removed from the shaft supporting portion 51*a* also in the other set. There is little need to bend surroundings of the shaft supporting portion 51*a*. When attaching the headset cover 8 to the cover supporting portion 51, the procedure is reversed.

According to the present embodiment as described above, in an actual-use state, relative displacement between the shaft portion 80 and the shaft supporting portion 51*a* in an insert-remove direction is regulated by the displacement regulation structure 200. Displacement of the headset cover 8 in the axial direction (X direction) of the shaft portion 80 is regulated, and thus, a configuration is highly robust against, for example, the shaft portion 80 falling off due to impact during transportation. During assembly and disassembly, it is possible to easily attach and detach the headset cover 8 to and from the cover supporting portion 51 by rotating the headset cover 8 to the attach-detach position. Therefore, deformation of surroundings of the shaft supporting portion 51*a* is hardly necessary. The shaft portion 80 and the shaft supporting portion 51*a* can be configured by highly rigid components. This also contributes to improvement of robustness against falling off or the like of the shaft portion 80 due to impact during transportation.

Second Embodiment

Figure 18C:
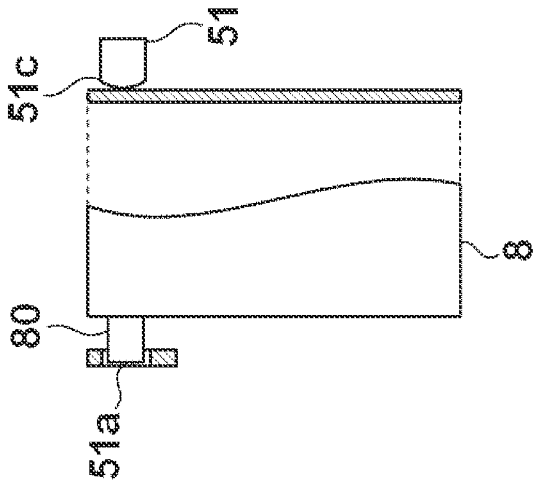
FIGS. 18A to 18C are views illustrating another example of a pivot structure of the headset cover.
Figure 18B:
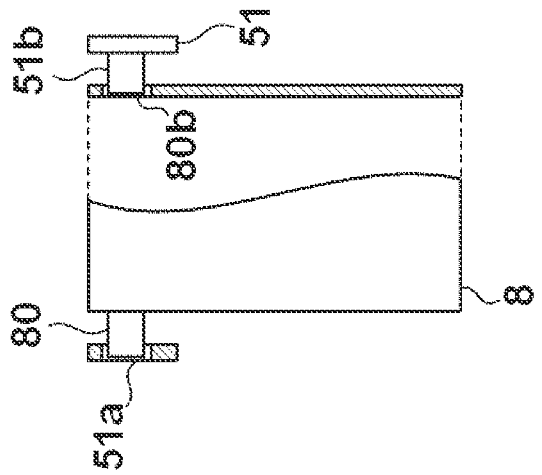
Figure 18A:
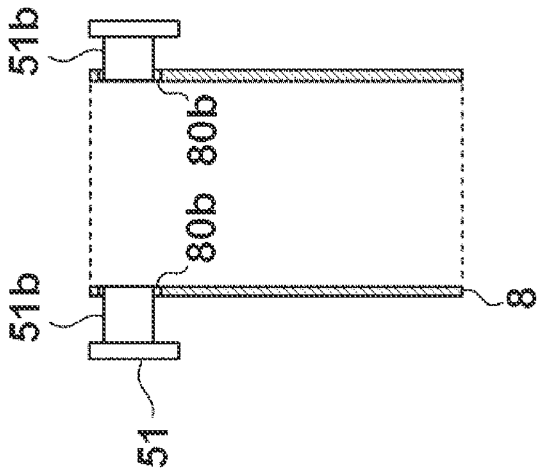

The pivot structure of the headset cover 8 is not limited to the structure of the first embodiment. For example, as in the example of FIG. 18A, the shaft portion 51*b* may be provided on the cover supporting portion 51 side, and a shaft supporting portion 80*b* may be provided on the headset cover 8 side. Further, as in the example of FIG. 18B, in the headset cover 8, the shaft portion 80 may be provided on one side of the X direction and a shaft supporting portion 80*b* may be provided on the other side of the X direction, and in the cover supporting portion 51, the shaft supporting portion 51*a* may be provided on one side of the X direction and a shaft portion 51*b* may be provided on the other side of the X direction. In addition, as in the example of FIG. 18C, a structure in which there is one set of the shaft portion and the shaft supporting portion may be taken. In the example of FIG. 18C, on one side of the X direction, the shaft portion 80 is provided in the headset cover 8 and the shaft supporting portion 51*a* is provided in the cover supporting portion 51. Then, on the other side of the X-direction, a structure in which a contact portion 51*c* of the cover supporting portion 51 is in contact with the side wall of the headset cover 8 is taken and a pivot structure is not taken.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-162666, filed Oct. 7, 2022, which is hereby incorporated by reference herein in its entirety.

What is claimed is:

1. A printing apparatus comprising:
a support member configured to support a printhead that performs printing by discharging liquid;
a rotating member configured to be supported by the support member so as to be rotatable and capable of rotating to an open position at which the printhead is capable of being attached to or detached from the support member and a closed position at which the printhead is not capable of being attached to or detached from the support member;
a shaft portion arranged on one of the rotating member and the support member, and being a rotation center of the rotating member;
a shaft supporting portion arranged on the other of the rotating member and the support member, the shaft portion being inserted into the shaft supporting portion in an axial direction so as to be supported by the shaft supporting portion; and
a displacement regulation structure configured to
regulate displacement of the rotating member in the axial direction with respect to the support member in a predetermined rotation range of the rotating member, and
permit displacement of the rotating member in the axial direction at a rotation position outside the predetermined rotation range.

2. The printing apparatus according to claim 1, wherein
in a case where the rotating member is positioned at the rotation position, the shaft portion is capable of being inserted into or removed from the shaft supporting portion.

3. The printing apparatus according to claim 1, further comprising:
a rotation regulation unit configured to be capable of regulating rotation and releasing regulation of rotation of the rotating member to the rotation position.

4. The printing apparatus according to claim 1, wherein
the support member includes:
a first portion configured to support the rotating member to be rotatable; and
a second portion configured to be capable of being attached to and detached from the first portion, and
wherein the second portion is configured to regulate the rotating member to prevent the rotating member from rotating to the rotation position.

5. The printing apparatus according to claim 4, wherein
the second portion is a portion configured to support the printhead.

6. The printing apparatus according to claim 1, wherein
the open position and the closed position are positions included in the predetermined rotation range.

7. The printing apparatus according to claim 1, wherein
the displacement regulation structure includes:
a first regulation portion arranged in the support member; and
a second regulation portion arranged in the rotating member, and
wherein the first regulation portion and the second regulation portion
in the predetermined rotation range, face each other in the axial direction so as to regulate displacement of the rotating member in the axial direction, and
outside the predetermined rotation range, do not face each other in the axial direction.

8. The printing apparatus according to claim 7, wherein
the first regulation portion is a portion protruding in the axial direction in the support member, and
the second regulation portion is a portion protruding in the axial direction in the rotating member.

9. The printing apparatus according to claim 1, further comprising:
two sets of the shaft portion and the shaft supporting portion, spaced apart in the axial direction.

10. The printing apparatus according to claim 1, wherein
the shaft portion is arranged in the rotating member, and
the shaft supporting portion is a hole formed in a wall portion of the support member.

11. The printing apparatus according to claim 1, further comprising:
a connecting member including a connecting portion to be connected to a liquid introduction portion of the printhead, and configured to join the liquid introduction portion to a liquid supply path via the connecting portion, wherein
the rotating member is configured to hold the connecting member,
the closed position is a connected position at which the liquid introduction portion and the connecting portion are connected, and
the open position is a connection released position at which the liquid introduction portion and the connecting portion are not connected.

12. The printing apparatus according to claim 1, further comprising:
a conveyance roller configured to convey a print medium in a conveyance direction,
wherein
the support member moves in a direction intersecting the conveyance direction.

13. The printing apparatus according to claim 1, wherein
the rotating member includes a positioning portion configured to, at the closed position, position the printhead with respect to the support member.

14. The printing apparatus according to claim 1, wherein
the support member includes an engaging portion configured to maintain the rotating member at the closed position.

15. A printing apparatus comprising:
a printhead configured to perform printing by discharging liquid;
a support member configured to support the printhead;
a rotating member configured to be supported by the support member so as to be rotatable and capable of rotating to an open position at which the printhead is capable of being attached to or detached from the support member and a closed position at which the printhead is not capable of being attached to or detached from the support member;
a shaft portion arranged on one of the rotating member and the support member, and being a rotation center of the rotating member;
a shaft supporting portion arranged on the other of the rotating member and the support member, the shaft portion being inserted into the shaft supporting portion in an axial direction so as to be supported by the shaft supporting portion; and a displacement regulation structure configured to
regulate displacement of the rotating member in the axial direction with respect to the support member in a predetermined rotation range of the rotating member, and
permit displacement of the rotating member in the axial direction at a rotation position outside the predetermined rotation range.

* * * * *